(12) United States Patent
Sasaki et al.

(10) Patent No.: US 7,943,288 B2
(45) Date of Patent: May 17, 2011

(54) THIN-FILM MAGNETIC HEAD STRUCTURE, METHOD OF MANUFACTURING THE SAME, AND THIN-FILM MAGNETIC HEAD

(75) Inventors: Yoshitaka Sasaki, Santa Clara, CA (US); Hiroyuki Ito, Milpitas, CA (US); Takehiro Kamigama, Shatin (CN); Tatsushi Shimizu, Hong Kong (CN); Hironori Araki, Milpitas, CA (US); Shigeki Tanemura, Santa Clara, CA (US); Kazuo Ishizaki, Milpitas, CA (US)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 435 days.

(21) Appl. No.: 12/232,722

(22) Filed: Sep. 23, 2008

(65) Prior Publication Data
US 2009/0042143 A1    Feb. 12, 2009

Related U.S. Application Data

(62) Division of application No. 11/179,728, filed on Jul. 13, 2005, now Pat. No. 7,492,555.

(51) Int. Cl.
*G11B 5/31* (2006.01)
(52) U.S. Cl. ............... 430/320; 430/317; 29/603.07; 216/22
(58) Field of Classification Search ................. None
See application file for complete search history.

(56) References Cited

U.S. PATENT DOCUMENTS

| 4,656,546 A | 4/1987 | Mallory |
| 4,672,493 A | 6/1987 | Schewe |
| 6,350,556 B1 * | 2/2002 | Asanuma ............... 430/313 |
| 6,504,675 B1 | 1/2003 | Shukh et al. |
| 6,525,904 B1 | 2/2003 | Sasaki |
| 6,687,096 B2 | 2/2004 | Sasaki et al. |
| 6,742,242 B2 | 6/2004 | Sasaki |
| 7,140,095 B2 | 11/2006 | Matono |
| 2002/0036871 A1 | 3/2002 | Yano et al. |

(Continued)

FOREIGN PATENT DOCUMENTS

JP    59-065920 A  *  4/1984

(Continued)

OTHER PUBLICATIONS

Jul. 13, 2010 Office Action issued in Japanese Patent Application No. 2006-152192 (with translation).

(Continued)

*Primary Examiner* — John A. McPherson
(74) *Attorney, Agent, or Firm* — Oliff & Berridge, PLC

(57) ABSTRACT

A method of manufacturing a thin-film magnetic head structure comprises the steps of preparing an insulating layer 10; forming a first resist layer 51 provided with a first slit pattern 51a corresponding to a very narrow groove part and a second slit pattern 51b corresponding to a temporary groove part integrally extending from the very narrow groove part along outer edges of a main depression onto the insulating layer 10; etching the insulating layer 10 while using the first resist layer 51 as a mask; eliminating the first resist layer 51; forming a second resist layer having an opening pattern corresponding to the main depression onto the insulating layer 10; and etching the insulating layer 10 while using the second resist layer as a mask.

5 Claims, 20 Drawing Sheets

U.S. PATENT DOCUMENTS

| | | |
|---|---|---|
| 2004/0012884 A1 | 1/2004 | Sato et al. |
| 2004/0020778 A1* | 2/2004 | Lin et al. .................... 205/119 |
| 2004/0252415 A1 | 12/2004 | Shukh et al. |
| 2006/0002014 A1 | 1/2006 | Sasaki et al. |
| 2006/0077589 A1 | 4/2006 | Sasaki et al. |
| 2006/0077590 A1 | 4/2006 | Sasaki et al. |
| 2006/0103979 A1 | 5/2006 | Sasaki et al. |
| 2006/0103980 A1 | 5/2006 | Sasaki et al. |

FOREIGN PATENT DOCUMENTS

| | | |
|---|---|---|
| JP | A-2001-067617 | 3/2001 |
| JP | A-2001-266309 | 9/2001 |
| JP | A-2002-092821 | 3/2002 |
| JP | A-2003-006811 | 1/2003 |
| JP | A-2003-203311 | 7/2003 |
| JP | A-2003-242607 | 8/2003 |
| JP | A-2004-094997 | 3/2004 |
| JP | A-2005-071430 | 3/2005 |
| JP | A-2006-331613 | 12/2006 |

OTHER PUBLICATIONS

U.S. Appl. No. 11/073,225 to Sasaki et al., *Magnetic Head for Perpendicular Magnetic Recording and Method of Manufacturing Same*, Mar. 7, 2005.

Office Action issued in Japanese Patent Application No. 2006-152192, dispatched on Mar. 1, 2011 (w/English-language Translation).

\* cited by examiner

*Fig.17*
(a)
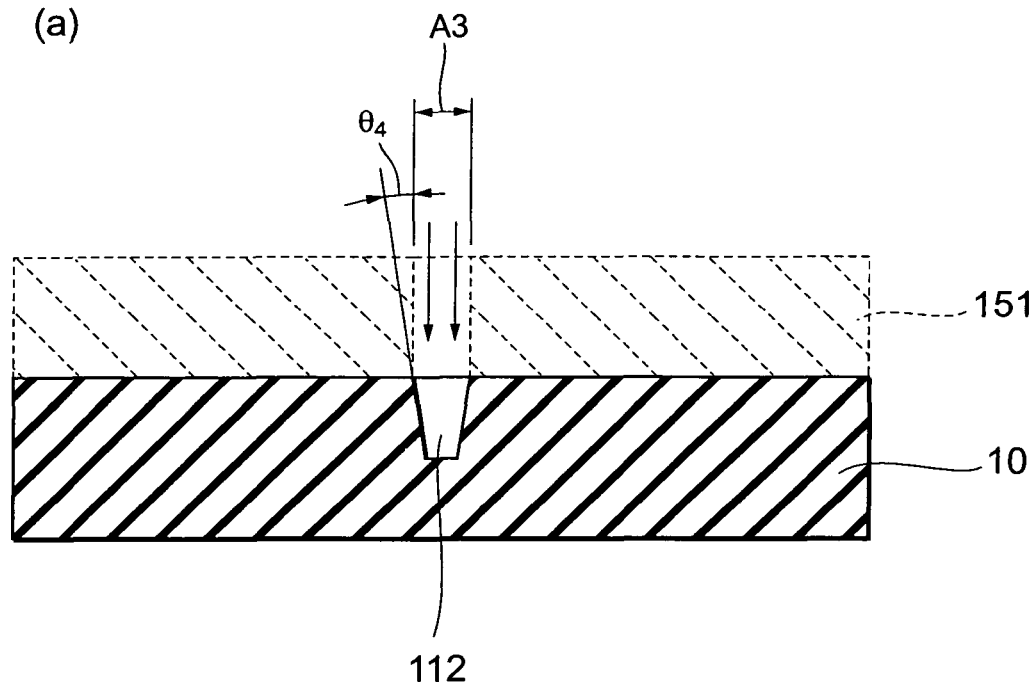
(b)
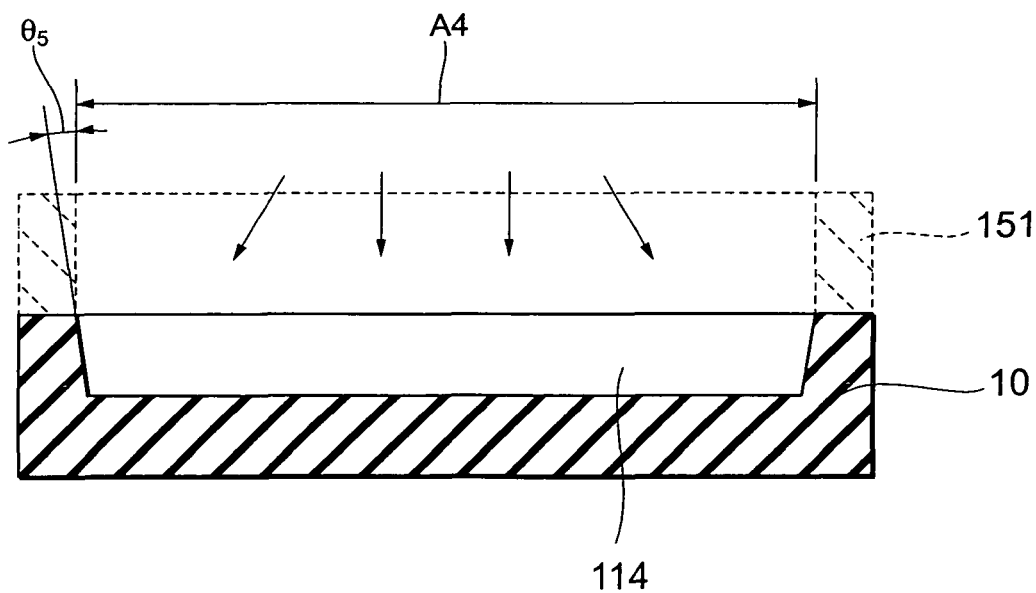

Fig.19
(a)
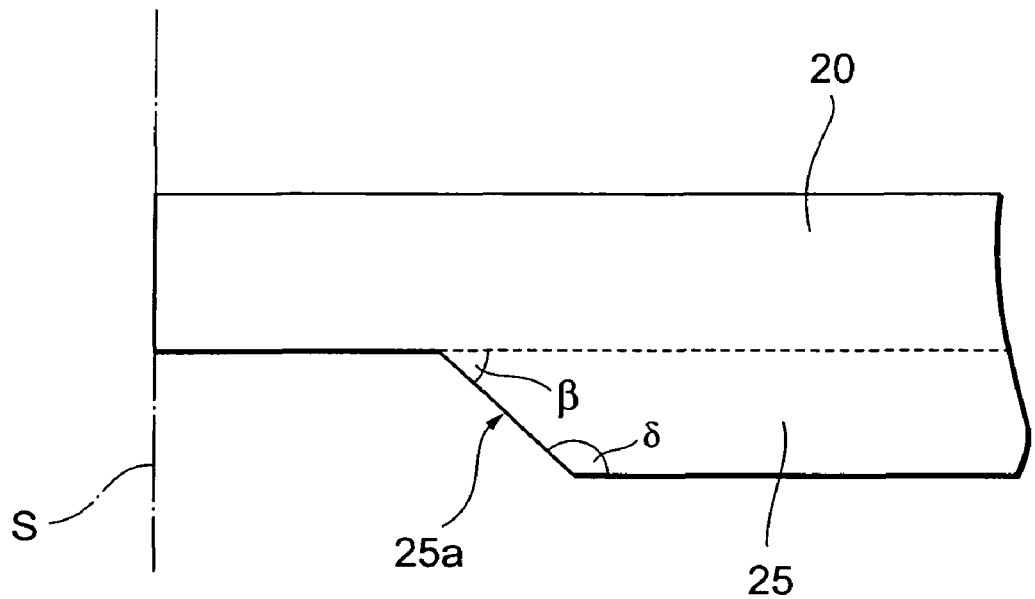
(b)
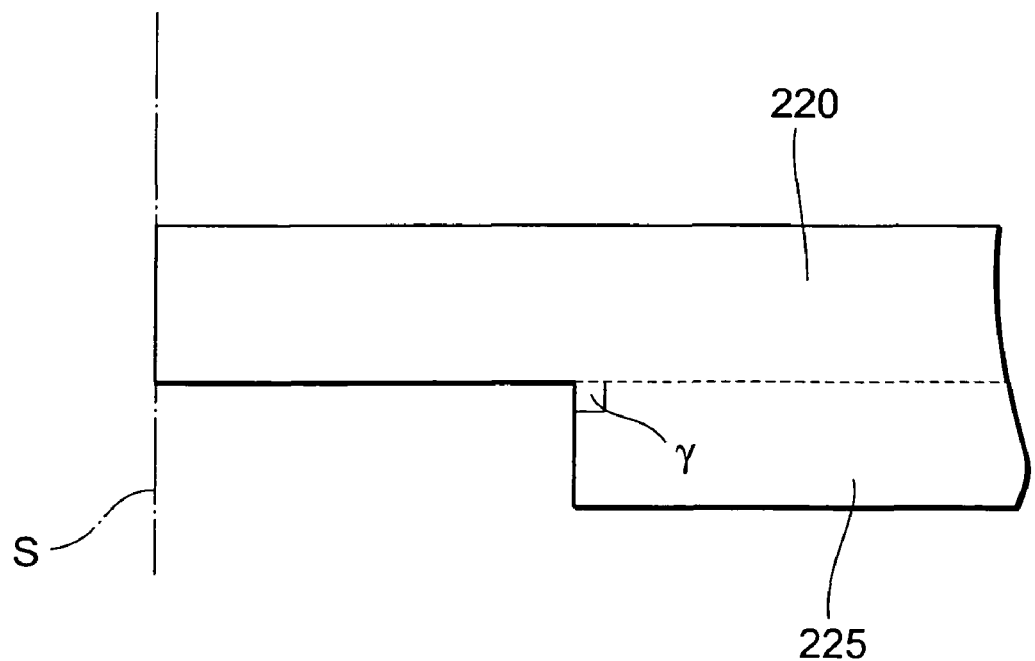

Fig.20
(a)
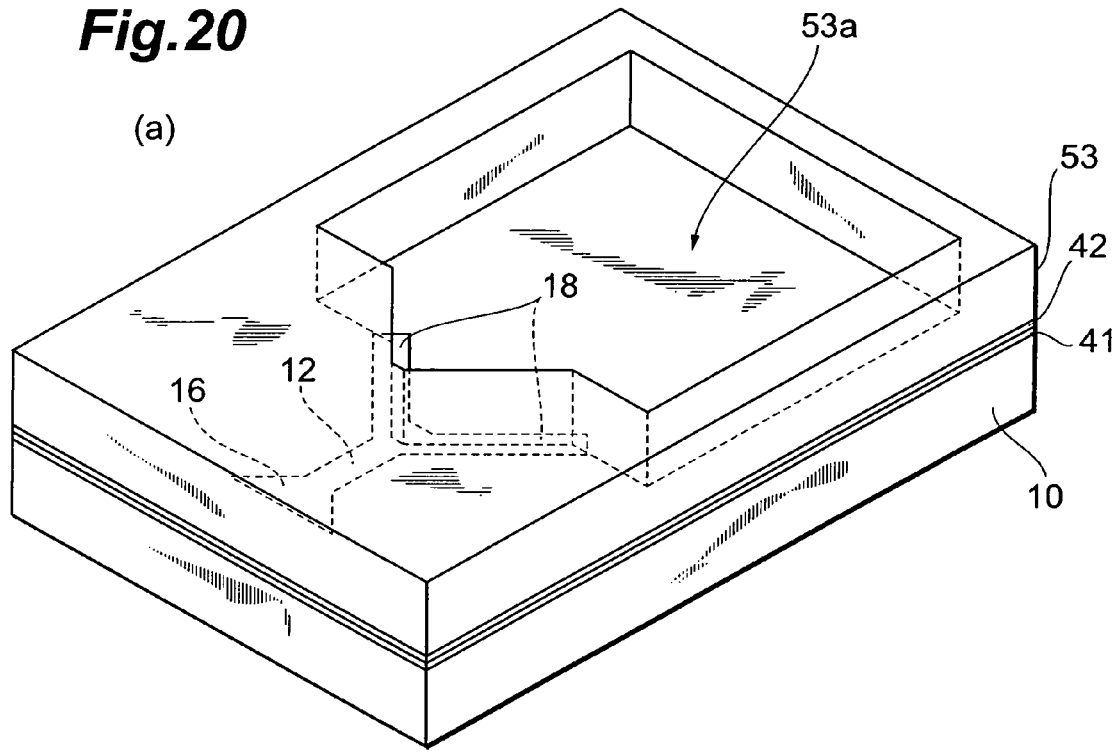
(b)
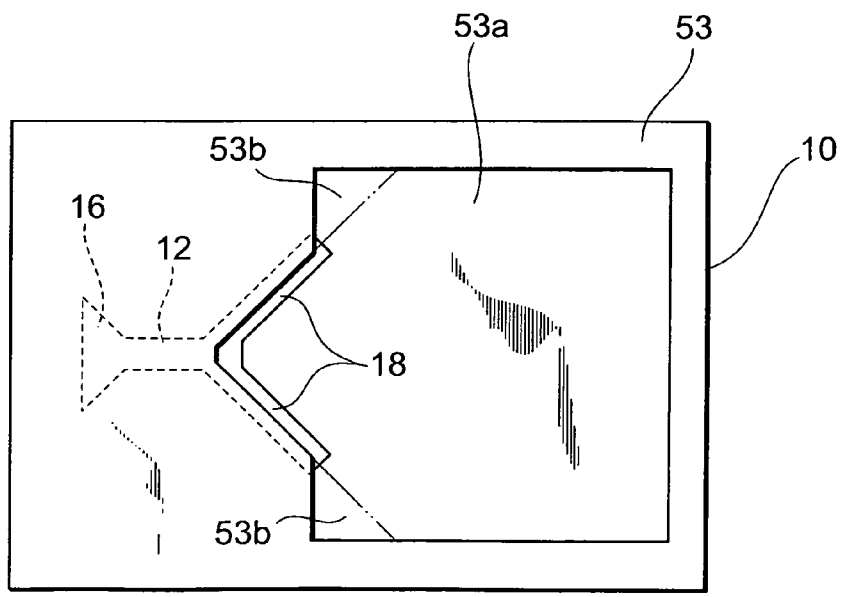

THIN-FILM MAGNETIC HEAD STRUCTURE, METHOD OF MANUFACTURING THE SAME, AND THIN-FILM MAGNETIC HEAD

This application is a division of U.S. patent application Ser. No. 11/179,728, filed Jul. 13, 2005, the entire contents of which are hereby incorporated by reference.

BACKGROUND OF THE INVENTION

1. Field of the Invention

The present invention relates to a thin-film magnetic head structure for manufacturing a thin-film magnetic head which performs perpendicular magnetic recording operations, a method of manufacturing the same, and a thin-film magnetic head.

2. Related Background Art

In recent years, the areal density in hard disk drives has been increasing remarkably. Recently, the areal density in hard disk drives has reached 160 to 200 GB/platter in particular, and is about to increase further. Accordingly, thin-film magnetic heads have been required to improve their performances.

In terms of recording schemes, thin-film magnetic heads can roughly be divided into those for longitudinal recording in which information is recorded in a (longitudinal) direction of a recording surface of a hard disk (recording medium) and those for perpendicular recording in which data is recorded while the direction of recording magnetization formed in the hard disk is perpendicular to the recording surface. As compared with the thin-film magnetic heads for longitudinal recording, the thin-film magnetic heads for perpendicular recording have been considered more hopeful, since they can realize a much higher recording density while their recorded hard disks are less susceptible to thermal fluctuations.

Conventional thin-film magnetic heads for perpendicular recording are disclosed, for example, in U.S. Pat. No. 6,504,675, U.S. Pat. No. 4,656,546, U.S. Pat. No. 4,672,493, and Japanese Patent Application Laid-Open No. 2004-94997.

Meanwhile, when thin-film magnetic heads for perpendicular recording record data onto areas in inner and outer peripheries of a hard disk, a magnetic pole end part disposed on the side of a medium-opposing surface (also referred to as air bearing surface, ABS) opposing the recording medium (hard disk) yields a certain skew angle with respect to a data recording track. In perpendicular magnetic recording heads (hereinafter also referred to as "PMR") having a high writing capability, the skew angle generated in the magnetic pole end part has caused a problem of so-called side fringe in which unnecessary data are recorded between adjacent tracks. The side fringe adversely affects the detection of servo signals and the S/N ratio of reproduced waveforms. Therefore, in conventional PMRs, the magnetic pole end part on the air bearing surface side in the main magnetic pole layer has a bevel form gradually narrowing in width toward one direction (see, for example, Japanese Patent Application Laid-Open Nos. 2003-242067 and 2003-203311 in this regard).

In a PMR head in which the magnetic pole end part on the air bearing surface side of the above-mentioned main magnetic pole layer is formed like a bevel, the width of the magnetic pole end part (hereinafter referred to as magnetic pole width) is not sufficiently uniform, so that it is uneven in the longitudinal direction of the main magnetic pole layer. Therefore, when the above-mentioned magnetic pole end part of the main magnetic pole layer formed on the wafer is cut at a predetermined position so as to define the air bearing surface of the main magnetic pole layer, it has been problematic in that the magnetic pole width on the air bearing surface may vary depending on the cutting position. Therefore, in the conventional PMR, there have been cases where the track width (recording track width) in the air bearing surface greatly varies among products.

Hence, the inventors have proposed a thin-film magnetic head structure equipped with a base insulating layer having a magnetic pole forming depression which has been sunken into a form corresponding to the main magnetic pole layer beforehand and includes a very narrow groove part having a substantially uniform width. This magnetic pole forming depression includes a variable width depression continuously extending from an end part of the very narrow groove part while gradually increasing the width as distanced farther from the very narrow groove part, and a fixed width depression continuously extending from an end part of the variable width depression. When such a base insulating layer is used, the main magnetic pole layer is formed so as to be embedded in the magnetic pole forming depression. Therefore, when the main magnetic pole layer is cut at the very narrow groove part in the magnetic pole forming depression at the time of defining the air bearing surface, the magnetic pole width in the air bearing surface becomes the same width at a high precision.

However, the following problem may occur when forming the above-mentioned magnetic pole forming depression into a base insulating layer.

The above-mentioned magnetic pole forming depression is made by the steps of applying a photoresist onto a base insulating layer made of alumina ($Al_2O_3$); patterning the photoresist using a predetermined photomask, so as to form a resist layer exposing the surface of the base insulating layer into a form corresponding to the magnetic pole forming depression; and then performing reactive ion etching (hereinafter referred to as RIE) while using the resist layer as a mask, so as to remove the part not formed with the resist layer. The opening width of the resist layer corresponding to the very narrow groove part is much smaller than the opening width of the resist layer corresponding to the variable depression and fixed width depression. Therefore, when performing RIE using such a resist layer, radical ions substantially vertically enter the portion corresponding to the very narrow groove, but do not have such a directivity so much in the portion corresponding to the variable width depression and fixed width depression and are likely to enter there in directions other than the substantially vertical direction as well. Consequently, in the magnetic pole forming depression formed by RIE, the angle of inclination of side faces has been smaller in the very narrow groove part than in the other parts. Therefore, the decrease in bottom area with respect to the opening area other than the very narrow groove part is much more remarkable than the decrease in bottom area with respect to the opening area of the very narrow groove part, so that the volume of magnetic pole forming depression decreases. Hence, when the main magnetic pole layer is formed by using such a magnetic pole forming depression, the quantity of magnetism (also referred to as magnetic volume) in the main magnetic pole layer decreases, which makes it hard to further improve the overwrite characteristic.

SUMMARY OF THE INVENTION

In order to overcome the above-mentioned problem, it is an object of the present invention to provide a thin-film magnetic head structure which can further improve the overwrite characteristic, a method of manufacturing the same, and a thin-film magnetic head.

For overcoming the above-mentioned problem, in one aspect, the present invention provides a method of manufacturing a thin-film magnetic head structure adapted to manufacture a thin-film magnetic head comprising a main magnetic pole layer having a magnetic pole end part on a side of a medium-opposing surface opposing a recording medium; a write shield layer opposing the magnetic pole end part so as to form a recording gap layer on the medium-opposing surface side; a thin-film coil wound about the write shield layer or main magnetic pole layer; and a base insulating layer formed with a magnetic pole forming depression, filled with the main magnetic pole layer, including a very narrow groove part defining a form of the magnetic pole end part and a main depression integrally extending from an end part of the very narrow groove part remote from the medium-opposing surface; the method comprising, when forming the base insulating layer with the magnetic pole forming depression, the steps of forming a first resist layer on the base insulating layer, the first resist layer having a first slit pattern corresponding to the very narrow groove part in the magnetic pole forming depression and a second slit pattern integrally extending from the first slit pattern and corresponding to a temporary groove part integrally extending from the very narrow groove part along an outer edge of the main depression; etching the base insulating layer while using the first resist layer as a mask; forming a second resist layer having an opening pattern corresponding to the main depression on the base insulating layer after removing the first resist layer; and etching the base insulating layer while using the second resist layer as a mask.

When forming a magnetic pole forming depression for embedding a magnetic material so as to form a main magnetic pole layer, the method of manufacturing a thin-film magnetic head structure in accordance with the present invention uses two resist layers of the first and second resist layers. Namely, the first resist layer formed with the first and second slit patterns initially forms a very narrow groove part and a temporary groove part integrally extending from the very narrow groove part along an outer edge of the main depression. Subsequently, the second resist layer forms a main depression. Therefore, when etching is performed while using the first resist layer as a mask, radical ions substantially vertically enter the portion where the base insulating layer is exposed by the first and second slit patterns, whereby the angle of inclination becomes quite acute at side faces of the very narrow groove part and temporary groove part. As a result, the bottom area of the magnetic pole forming depression increases, thereby enhancing the magnetic volume in the main magnetic pole layer, which can further improve the overwrite characteristic.

Preferably, the etching of the base insulating layer is deeper when using the second resist layer as the mask than when using the first resist layer as the mask. As a consequence, the volume of the magnetic pole forming depression increases more, and embedding a magnetic material into the magnetic pole forming depression forms a lower yoke layer under the main magnetic pole layer, which can enhance the magnetic volume more together with the main magnetic pole layer.

Preferably, at least a part of the main depression is constituted by a variable width depression integrally extending from the end part of the very narrow groove part remote from the medium-opposing surface and gradually increasing the width as distanced farther from the very narrow groove part, and the second slit pattern extends along the outer edge of the variable width depression. In this case, when forming the main magnetic pole layer, the magnetic material grown in the variable width depression gradually enters the very narrow groove part from the end part thereof, whereby the very narrow groove part can reliably be filled with the magnetic material.

Preferably, the second slit pattern extends in a bifurcating fashion from the first slit pattern along both outer edges of the main depression. Conventionally, the angle of inclination of side faces in the variable width depression has been so large that the distance from the air bearing surface to a start point of the variable width depression is substantially long in the bottom face of the variable width depression. This has been problematic in that it causes a phenomenon known as pole erasure by which data recorded beforehand on a hard disk is erased when information is further recorded at a high density. The pole erasure is a phenomenon in which, after data is written on a recording medium (hard disk) having a high maximum coercivity Hc, a leakage magnetic flux flows from the air bearing surface to the hard disk even when no write current flows through a thin-film coil, thereby erasing the other data. However, the present invention can achieve a very acute angle of inclination at side faces of the variable width depression, which shortens the distance from the air bearing surface to the start point of the variable width depression in the bottom face of the variable width depression, whereby the occurrence of pole erasure can be suppressed.

In another aspect, the present invention provides a thin-film magnetic head structure adapted to manufacture a thin-film magnetic head comprising a main magnetic pole layer having a magnetic pole end part on a side of a medium-opposing surface opposing a recording medium; a write shield layer opposing the magnetic pole end part so as to form a recording gap layer on the medium-opposing surface side; a thin-film coil wound about the write shield layer or main magnetic pole layer; and a base insulating layer formed with a magnetic pole forming depression, filled with the main magnetic pole layer, including a very narrow groove part defining a form of the magnetic pole end part and a main depression integrally extending from an end part of the very narrow groove part remote from the medium-opposing surface; wherein a stepped part is formed at a boundary between a bottom face of the main depression and a bottom face of the very narrow groove part.

Preferably, the bottom face of the main depression is positioned at a height lower than that of the bottom face of the very narrow groove part. This increases the volume of the magnetic pole forming depression, and embedding a magnetic material into the magnetic pole forming depression forms a lower yoke layer under the main magnetic pole layer. This further increases the magnetic volume, and thus can further improve the overwrite characteristic.

Preferably, the stepped part has an angle of inclination $\alpha$ falling within the range of $0°<\alpha<90°$. This allows the end part of the lower yoke layer on the air bearing surface side to approach the air bearing surface while suppressing the occurrence of pole erasure, thereby enhancing the magnetic volume accordingly, which can further improve the overwrite characteristic.

Preferably, the distance between the stepped part and the medium-opposing surface is 0.1 to 0.3 μm. This can further improve the magnetic volume of the lower yoke layer.

Preferably, the angle of inclination in at least a part of side faces of the main depression is substantially the same as the angle of inclination of a side face in the very narrow groove part. This makes the bottom area of the magnetic pole forming depression greater than that conventionally obtained, and further increases the volume of the magnetic pole forming depression, with which the magnetic volume of the main magnetic pole layer can further be enhanced.

Preferably, at least a part of the main depression is constituted by a variable width depression extending integrally from the end part of the very narrow groove part remote from the medium-opposing surface while gradually increasing the width as distanced farther from the very narrow groove part. In this case, when forming the main magnetic pole layer, the magnetic material grown in the variable width depression gradually enters the very narrow groove part from the end part thereof, whereby the very narrow groove part can reliably be filled with the magnetic material.

In still another aspect, the present invention provides a thin-film magnetic head structure adapted to manufacture a thin-film magnetic head comprising a main magnetic pole layer having a magnetic pole end part on a side of a medium-opposing surface opposing a recording medium; a write shield layer opposing the magnetic pole end part so as to form a recording gap layer on the medium-opposing surface side; a thin-film coil wound about the write shield layer or main magnetic pole layer; and a base insulating layer formed with a magnetic pole forming depression, filled with the main magnetic pole layer, including a very narrow groove part defining a form of the magnetic pole end part and a main depression integrally extending from an end part of the very narrow groove part remote from the medium-opposing surface; wherein at least a part of side faces in the main depression has an angle of inclination substantially the same as that of a side face in the very narrow groove part.

In the thin-film magnetic head structure in accordance with the present invention, the angle of inclination in a side face of the very narrow groove part and the angle of inclination of at least a part of side faces in the main depression are substantially the same. This makes the bottom area of the magnetic pole forming depression greater than that conventionally obtained, and increases the volume of the magnetic pole forming depression. As a result, the magnetic volume of the main magnetic pole layer increases, whereby the overwrite characteristic can further be improved.

Preferably, at least a part of the main depression is constituted by a variable width depression integrally extending from the end part of the very narrow groove part remote from the medium-opposing surface and gradually increasing the width as distanced farther from the very narrow groove part, whereas a side face in the variable width depression has an angle of inclination substantially the same as that of a side face in the very narrow groove part. In this case, when forming the main magnetic pole layer, the magnetic material grown in the variable width depression gradually enters the very narrow groove part from the end part thereof, whereby the very narrow groove part can be filled with the magnetic material more reliably.

Preferably, a side face of the very narrow groove part and variable width depression has an angle of inclination smaller than that of a side face of the remnant of the main depression excluding the variable width depression.

In still another aspect, the present invention provides a thin-film magnetic head comprising a main magnetic pole layer having a magnetic pole end part on a side of a medium-opposing surface opposing a recording medium; a write shield layer opposing the magnetic pole end part so as to form a recording gap layer on the medium-opposing surface side; a thin-film coil wound about the write shield layer or main magnetic pole layer; and a base insulating layer formed with a magnetic pole forming depression, filled with the main magnetic pole layer, including a very narrow groove part defining a form of the magnetic pole end part and a main depression integrally extending from an end part of the very narrow groove part remote from the medium-opposing surface; wherein a stepped part is formed at a boundary between a bottom face of the main depression and a bottom face of the very narrow groove part.

The present invention will be more fully understood from the detailed description given here in below and the accompanying drawings which are given by way of illustration only, and thus are not to be considered as limiting the present invention.

BRIEF DESCRIPTION OF THE DRAWINGS

FIG. 17 is a sectional view showing a major part of FIG. 16, in which (a) is a sectional view taken along the line XVIIA-XVIIA, whereas (b) is a sectional view taken along the line XVIIB-XVIIB;

FIG. 19 is a side view showing a part of main magnetic pole layers and lower yoke layers, in which (a) shows the main magnetic pole layer and lower yoke layer in the embodiment, whereas (b) shows conventional main magnetic pole layer and lower yoke layer; and FIG. 20 is a view showing a step of manufacturing a thin-film magnetic head structure in accordance with a modified example, in which (a) is a perspective view, whereas (b) is a top plan view.

DESCRIPTION OF THE PREFERRED EMBODIMENTS

Preferred embodiments of the present invention will now be explained with reference to the drawings. In the explanation, constituents identical to each other or those having functions identical to each other will be referred to with numerals identical to each other without repeating their overlapping descriptions.

Configuration of Thin-Film Magnetic Head Structure

Figure 1:
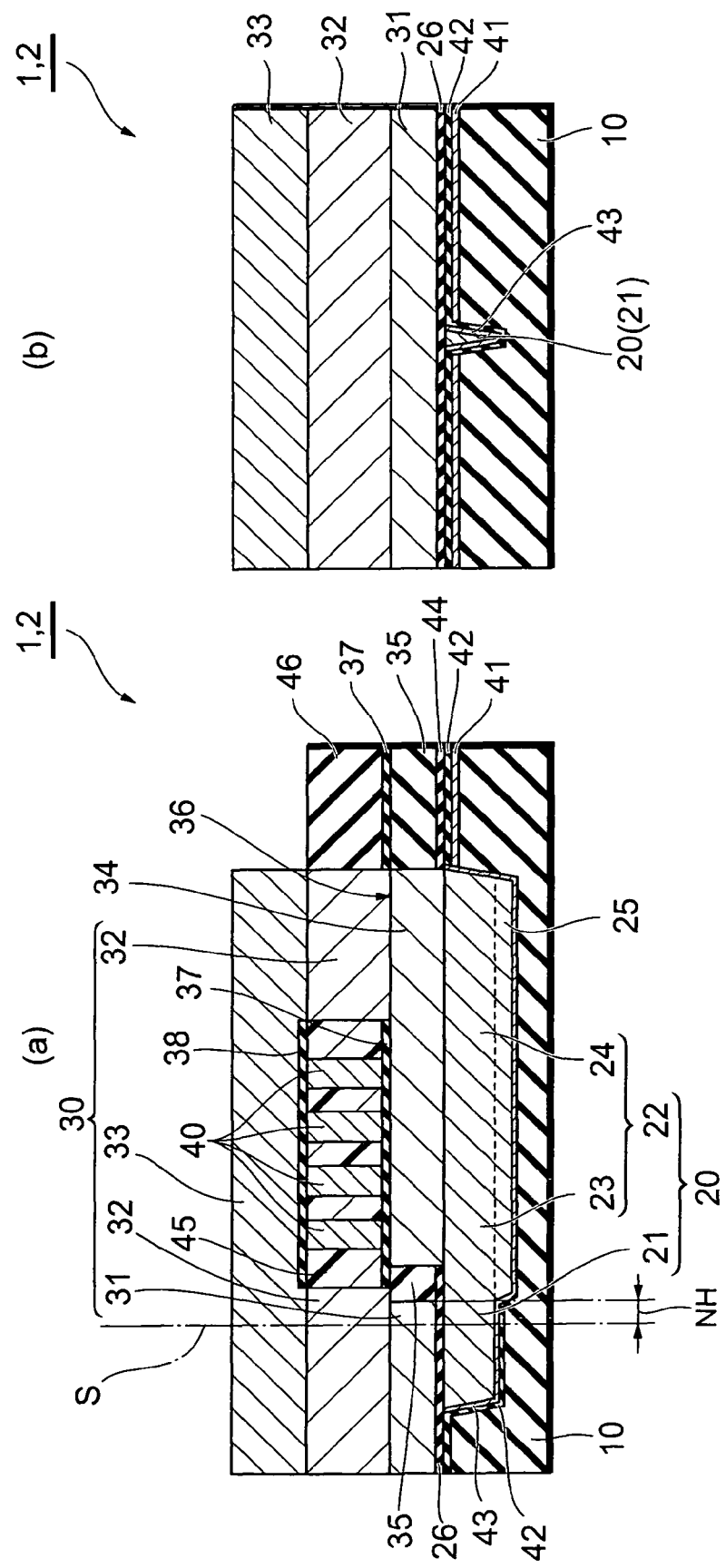
FIG. 1 is a sectional view of the thin-film magnetic head structure in accordance with an embodiment, in which (a) is a sectional view taken along a plane, perpendicular to an air bearing surface, intersecting a thin-film coil, whereas (b) is a sectional view taken at the air bearing surface.
Figure 2:
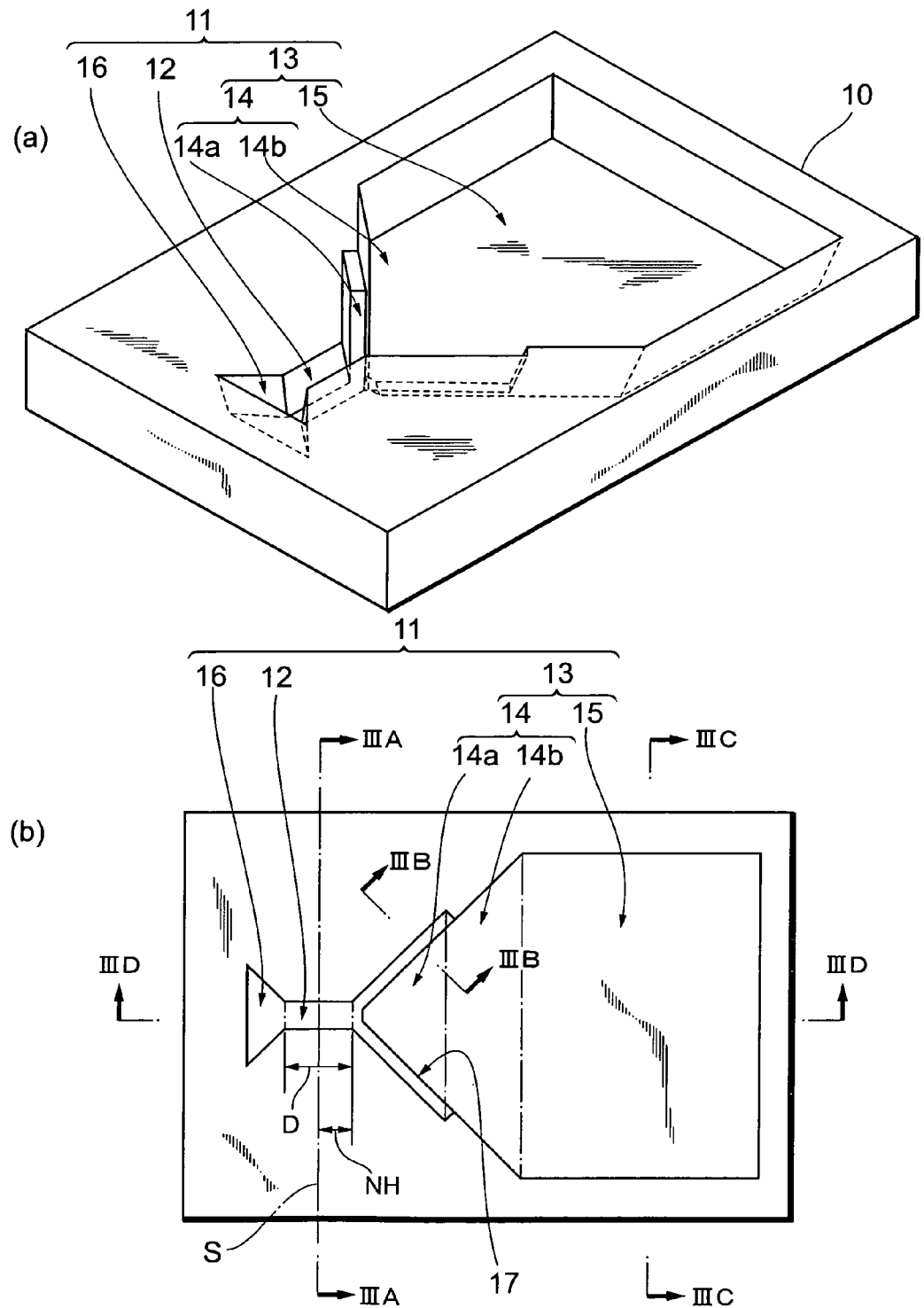
FIG. 2 is a view showing an insulating layer, in which (a) is a perspective view, whereas (b) is a plan view.
Figure 3:
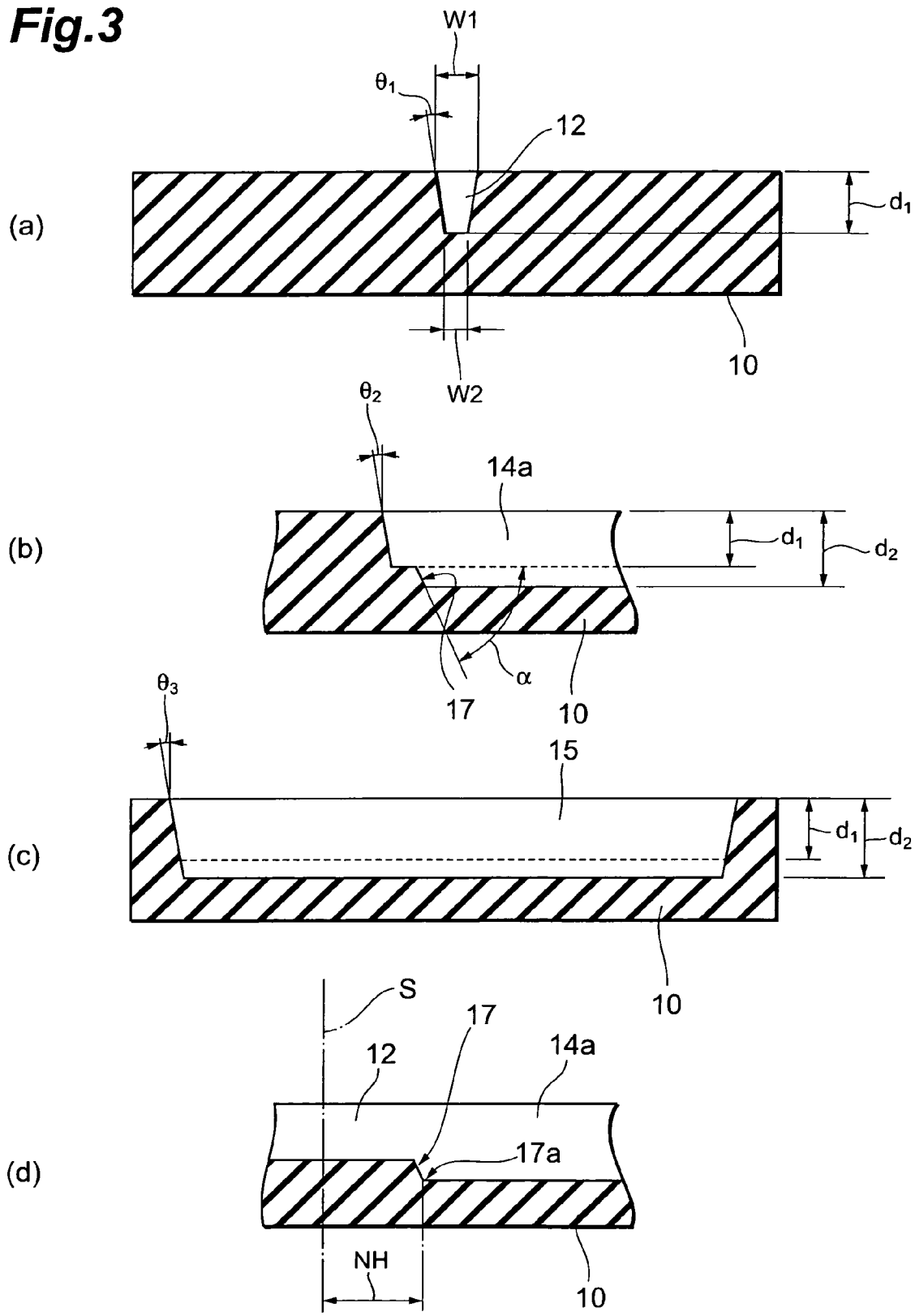
FIG. 3 is a sectional view showing a major part of FIG. 2, in which (a) is a sectional view taken along the line IIIA-IIIA (sectional view taken at the air bearing surface), (b) is a sectional view taken along the line IIIB-IIIB, (c) is a sectional view taken along the line IIIC-IIIC, and (d) is a sectional view taken along the line IIID-IIID.
Figure 4:
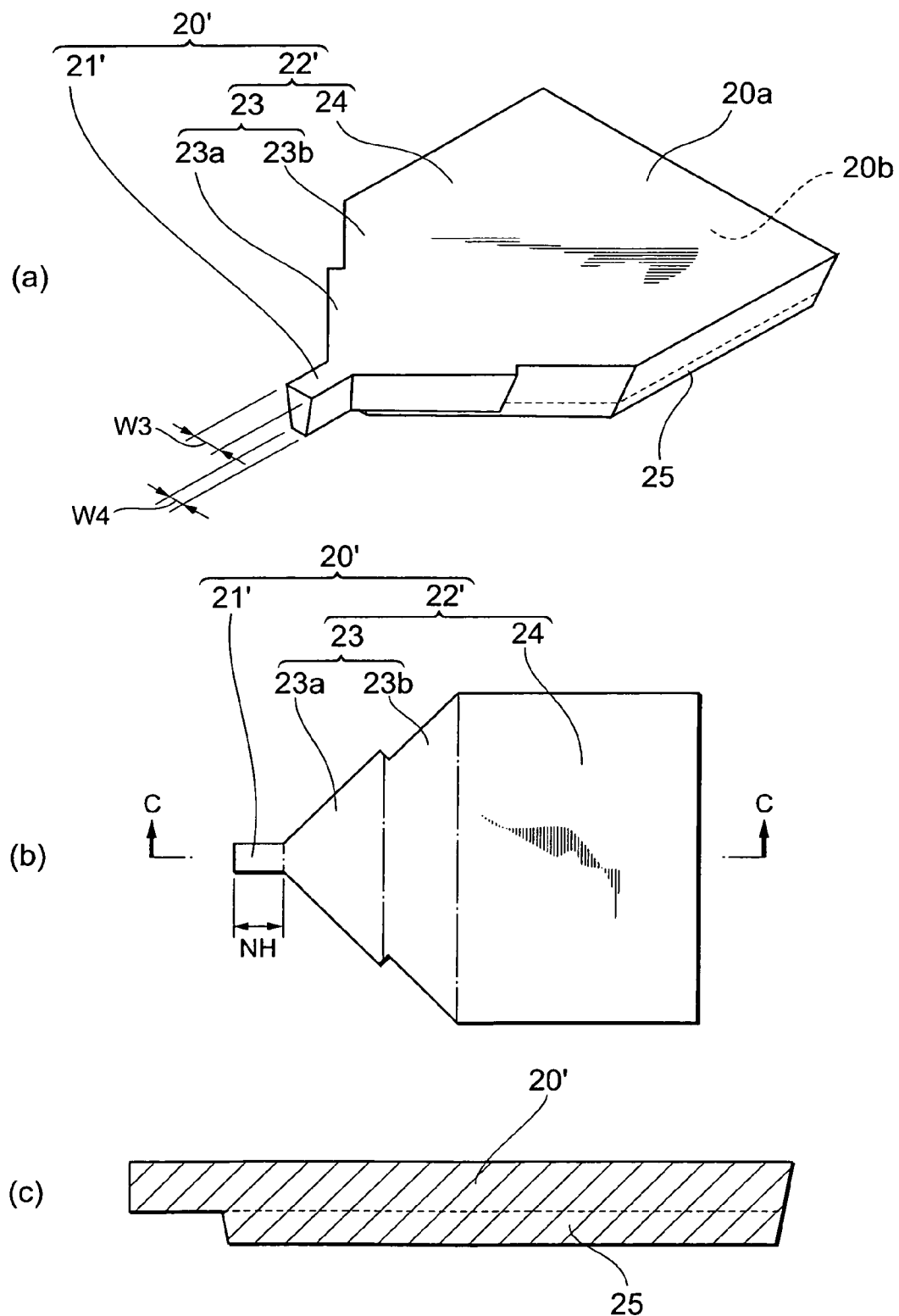
FIG. 4 is a view showing a main magnetic pole layer and a lower yoke layer after being cut along the air bearing surface, in which (a) is a perspective view, (b) is a plan view, and (c) is a sectional view taken along the line C-C.

With reference to FIGS. 1 to 4, the configuration of the thin-film magnetic head structure 1 in accordance with an embodiment will be explained. FIG. 1 is a sectional view of the thin-film magnetic head structure in accordance with this embodiment, in which (a) is a sectional view taken along a plane, perpendicular to an air bearing surface, intersecting a thin-film coil, whereas (b) is a sectional view taken at the air bearing surface. FIG. 2 is a view showing an insulating layer, in which (a) is a perspective view, whereas (b) is a plan view. FIG. 3 is a sectional view showing a major part of FIG. 2, in which (a) is a sectional view taken along the line IIIA-IIIA (sectional view taken at the air bearing surface), (b) is a sectional view taken along the line IIIB-IIIB, and (c) is a sectional view taken along the line IIIC-IIIC. FIG. 4 is a view showing a main magnetic pole layer and a lower yoke layer after being cut along the air bearing surface, in which (a) is a perspective view, (b) is a plan view, and (c) is a sectional view taken along the line C-C.

The thin-film magnetic head structure 1 in accordance with this embodiment has a configuration adapted to manufacture a PMR head. The thin-film magnetic head structure 1 is formed on an undepicted substrate, and is configured to yield a thin-film magnetic head 2 in accordance with the present invention when cut at an air bearing surface S which is a medium-opposing surface opposing a recording medium (hard disk).

The thin-film magnetic head structure 1 includes a reproducing head structure for manufacturing a reproducing head equipped with a magnetoresistive (MR) device or the like and a recording head structure for manufacturing a recording head. FIG. 1 shows a recording head structure formed on an insulating layer (base insulating layer) 10, while omitting the reproducing head structure.

The configuration of a major part of the recording head structure in the thin-film magnetic head structure 1 will be explained in the following, whereas the configuration of the other parts will be explained in manufacturing steps which will be set forth later. Each constituent in the recording head structure will be explained with the same name and numeral before and after being cut at the air bearing surface S unless otherwise specified. When distinguishing these states from each other, however, "'" will be added to the numeral referring to the state after being cut at the air bearing surface S.

As shown in FIG. 1, the thin-film magnetic head structure 1 comprises, as the recording head structure, the insulating layer 10 and a main magnetic pole layer 20, a recording gap layer 26, a write shield layer 30, a back magnetic pole layer 34, and a thin-film coil 40 which are laminated on the insulating layer 10.

The insulating layer 10, which is made of alumina ($Al_2O_3$), is formed at a predetermined area on the above-mentioned substrate. As shown in FIG. 2, the insulating layer 10 is formed with a cavity 11. The cavity 11 is a magnetic pole forming depression in the present invention, which is sunken into a form corresponding to the outer shape of a main magnetic pole layer 20 in order for the main magnetic pole layer 20 to attain set dimensions and shape. To this aim, the cavity 11 includes a very narrow groove part 12, a main depression 13, and a protruded depression 16.

The very narrow groove part 12 can substantially define by its groove width the track width of the thin-film magnetic head 2, and thus can improve the recording density by narrowing the track width. The length D of the very narrow groove part 12 is set longer than a neck height NH, which will be explained later, in order to secure the air bearing surface S at the midpoint in the length direction of the very narrow groove part 12. The depth $d_1$ of the very narrow groove part 12 is set to about 0.25 to 0.35 μm (e.g., 0.3 μm). As shown in part (a) of FIG. 3, the groove width W1 of the very narrow groove part 12 is designed uniformly in the length direction of the very narrow groove part 12, and is made much narrower than the main depression 13 in order to improve the recording density of the thin-film magnetic head. In the very narrow groove part 12, the groove width W2 intersecting the length direction on the bottom face side is smaller than the groove width W1 intersecting the length direction on the surface side such that a magnetic pole end part 21 of the main magnetic pole layer 20, which will be explained later, attains a bevel form gradually narrowing in the depth direction. Namely, the angle of inclination $\theta_1$ (which is also referred to as bevel angle) of each side face in the very narrow groove part 12 (i.e., the angle formed by the side face of the very narrow groove part 12 and a plane perpendicular to the surface of the insulating layer 10) is set to about 7 to 12° (e.g., 10°).

Returning to FIG. 2, the main depression 13 is constituted by a variable width depression 14 and a fixed depression 15. The variable width depression 14 comprises a first variable width depression 14a and a second variable width depression 14b. The first variable width depression 14a extends integrally from the end part of the very narrow groove part 12 remote from the air bearing surface S, while gradually increasing the groove width in a direction extending along the air bearing surface S as distanced farther from the very narrow groove part 12. A stepped part 17 extending along outer edges of the first variable width depression 14a is provided on the inside of the first variable width depression 14a, whereas the distance from a corner part 17a formed by the side and lower faces of the stepped part 17 to the air bearing surface S is about 0.1 to 0.3 µm, which is substantially the same as the neck height NH (see part (d) in FIG. 3). Namely, the height of the bottom face in the first variable width depression changes at the stepped part 17. Specifically, the height of the bottom face (defined by the depth $d_2$ of the main depression 13) on the second variable width depression 14b side of the stepped part 17 is lower than the height of the bottom face (defined by the depth $d_1$ of the very narrow groove part 12) on the very narrow groove part 12 side of the stepped part 17 (i.e., $d_2 > d_1$). The second variable width depression 14b has a groove width at the end part on the air bearing surface S side somewhat narrower than that of the end part of the first variable width depression 14a and continuously extends from the end part of the first variable width depression 14a remote from the air bearing surface S, while gradually increasing the groove width as distanced farther from the first variable width depression 14b. The angle of inclination $\theta_2$ of each side face in the first variable width depression 14a (i.e., the angle formed by the side face of the first variable width depression 14a and a plane perpendicular to the surface of the insulating layer 10) is set to about 7 to 12° (e.g., 10°). The angles of inclination $\theta_1$ and $\theta_2$ are identical to each other here, though not required to be so. The angle of inclination $\alpha$ of the stepped part 17 (the angle formed by a plane forming the stepped part 17 and a plane including the bottom face of the very narrow groove part 12 (see the broken line in part (b) of FIG. 3)) is preferably greater than 0° but smaller than 90°, more preferably greater than 0° but not more than 60°. The fixed width depression 15 continuously extends from the end part of the second variable width depression 14b remote from the air bearing surface S while having a fixed groove width in a direction extending along the air bearing surface S. The angle of inclination $\theta_3$ of each side face in the fixed width depression 15 (the angle formed by the side face of the fixed width depression 15 and a plane perpendicular to the surface of the insulating layer 10) is about 12 to 20° (e.g., 18°). Namely, each of the angles of inclination $\theta_1$ and $\theta_2$ is smaller than the angle of inclination $\theta_3$ of the fixed width depression 15, which is the remnant of the main depression 13 excluding the variable width depression 14. The protruded depression 16 continuously extends from the other end part of the very narrow groove part 12, while gradually increasing the groove width in a direction extending along the air bearing surface S as distanced farther from the very narrow groove part 12.

The main magnetic pole layer 20' in the present invention (as with the main magnetic pole layer 20 before cutting) is formed by filling the above-mentioned cavity 11 with a magnetic material. Therefore, as shown in FIG. 4, the main magnetic pole layer 20' includes a magnetic pole end part 21' corresponding to the very narrow groove part 12 of the cavity 11 and a yoke magnetic pole part 22' corresponding to the main depression 13 of the cavity 11. The main magnetic pole layer 20' has an upper face 20a which is a flat surface without steps.

Namely, the magnetic pole end part 21' is arranged at a position (on the air bearing surface S side) closer to the air bearing surface S than is the yoke magnetic pole part 22'. The track width of the magnetic pole end part 21' is uniformly defined by the very narrow groove part 12. In the magnetic pole end part 21', the width W3 on the upper face 20a side and the width W4 on the lower face 20b side in the direction extending along the air bearing surface S correspond to the groove widths W1 and W2 of the very narrow groove part 12, respectively, while each being uniform in the extending direction of the magnetic pole end part 21'. Namely, the width W4 is narrower than the width W3 in the magnetic pole end part 21' as in the very narrow groove part 12, thus yielding a bevel form whose width gradually decreases as distanced farther from the thin-film coil 40. The length of the magnetic pole end part 21' (distance from the air bearing surface S to the yoke magnetic pole part 22') corresponds to the neck height NH. The neck height NH is set to about 0.1 to 0.3 µm, for example.

The yoke magnetic pole part 22' is integrally formed from the same magnetic material as that of the magnetic pole end part 21', while having a volume sufficiently larger than that of the magnetic pole end part 21'. The yoke magnetic pole part 22' includes a variable width part 23 corresponding to the variable width depression 14 of the cavity 11 and a fixed width part 24 corresponding to the fixed width depression 15 of the cavity 11. The variable width part 23 is constituted by a first variable width part 23a and a second variable width part 23b which correspond to the first variable width depression 13a and second variable width depression 13b. In the lower part of the yoke magnetic pole part 22', a lower yoke layer 25 having a form corresponding to a part of the main depression 13 is integrally formed from the same magnetic material as that of the magnetic pole end part 21'.

Reference is now made to FIG. 1 again. The recording gap layer 26 is formed so as to be interposed between the magnetic pole end part 21 and the insulating layer 35 and first shield part 31 of the write shield layer 30 which will be explained later.

The write shield layer 30 includes the first shield part 31, second shield part 32, and third shield part 33. The first shield part 31 is formed at a position opposing the magnetic pole end part 21 by way of the recording gap layer 26 on the air bearing surface S side, while its length from the air bearing surface S is about 0.1 to 0.3 µm, which is substantially the same as the neck height NH. The second shield part 32 is formed on the upper side of the first shield part 31 and back magnetic pole layer 34, and is magnetically connected to the first shield part 31 and back magnetic pole layer 34. The third shield part 33 is formed on the upper side of the second shield part 32, and is magnetically connected thereto.

At a position distanced farther from the air bearing surface S than is the recording gap layer 26, the back magnetic pole layer 34 is magnetically connected to the yoke magnetic pole part 22 and second shield part 32. The back magnetic pole layer 34 forms a junction 36 with the second shield part 32.

The thin-film coil 40 is positioned above the yoke magnetic pole part 22 so as to bridge the variable width part 23 and fixed width part 24 by way of the back magnetic pole layer 34. While being insulated from insulating films 37, 38, the thin-film coil 40 is wound in a planar spiral about the write shield layer 30. The thin-film coil 40 may also be of helical type spirally wound about the main magnetic pole layer 20 or third shield part 33.

When cut at the middle part of the very narrow groove part 12 so as to form the air bearing surface S, the thin-film magnetic head structure 1 having the foregoing configuration yields the thin-film magnetic head 2 in the present invention.

Method of Manufacturing Thin-Film Magnetic Head Structure

Figure 5:
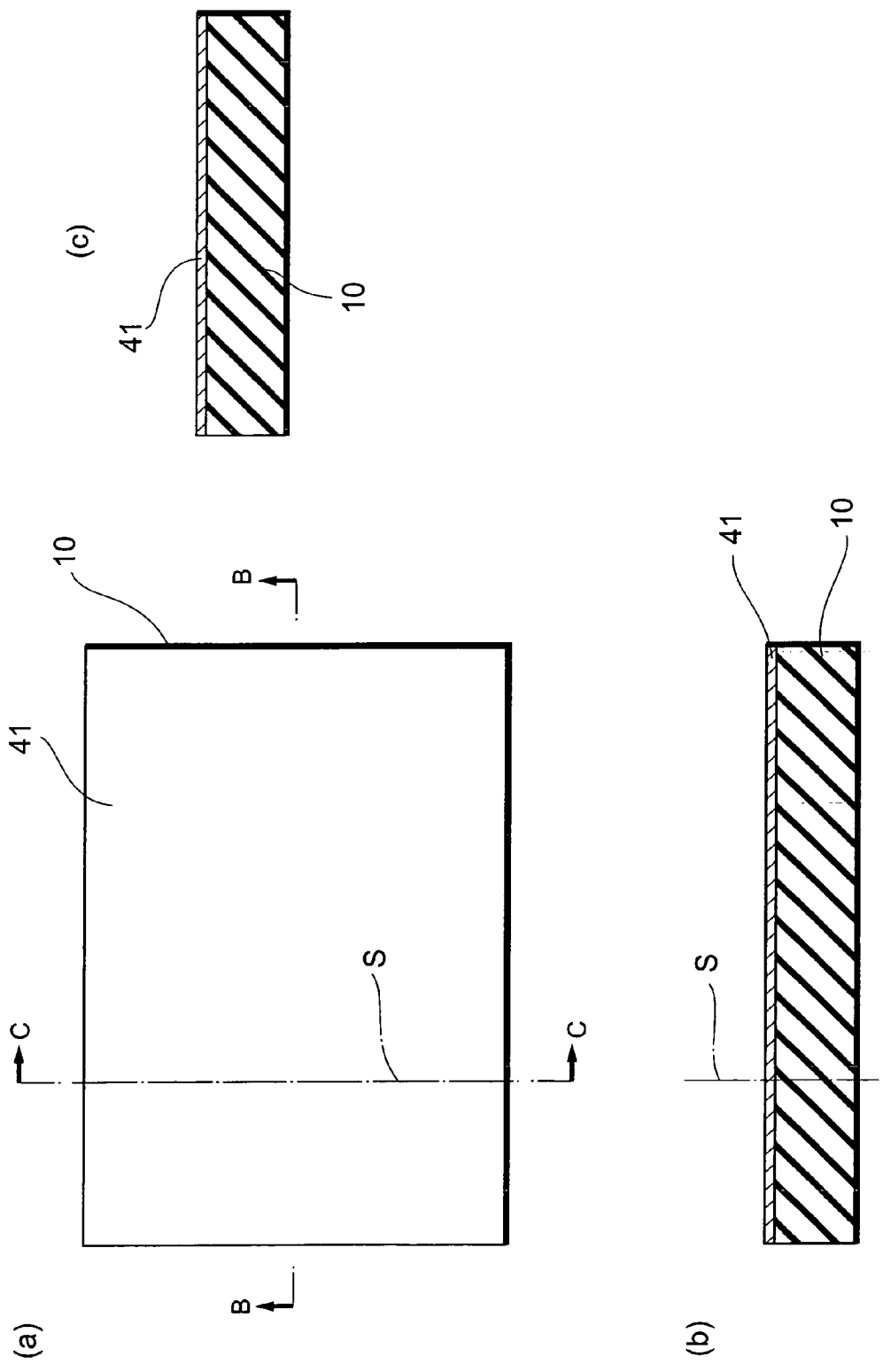
FIG. 5 is a view showing a step of the method of manufacturing a thin-film magnetic head structure in accordance with the embodiment in which (a) is a top plan view, (b) is a sectional view taken along the line B-B of (a), and (c) is a sectional view taken along the line C-C of (a) (sectional view taken at the air bearing surface)
Figure 6:
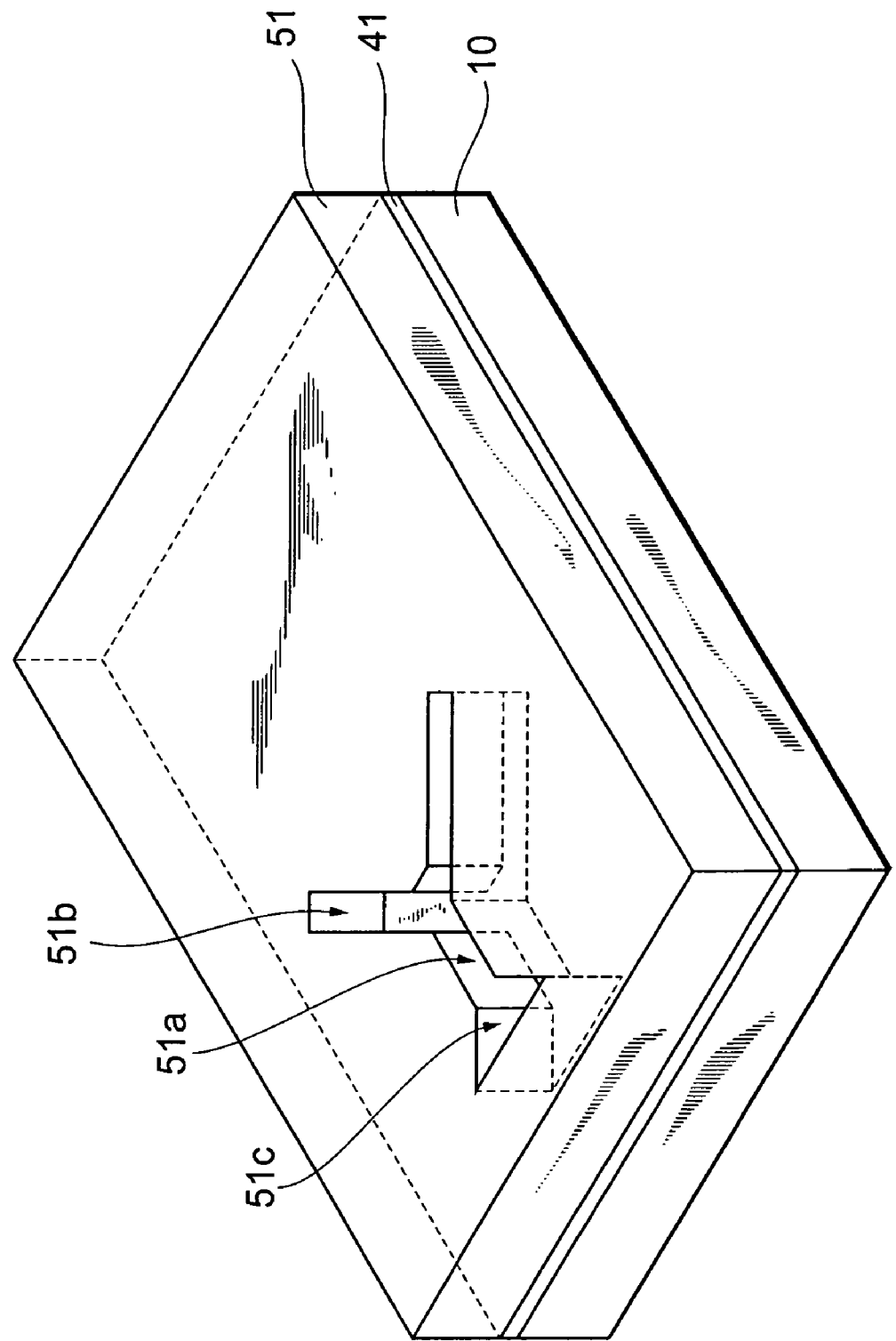
FIG. 6 is a perspective view showing a step subsequent to FIG. 5.
Figure 7:
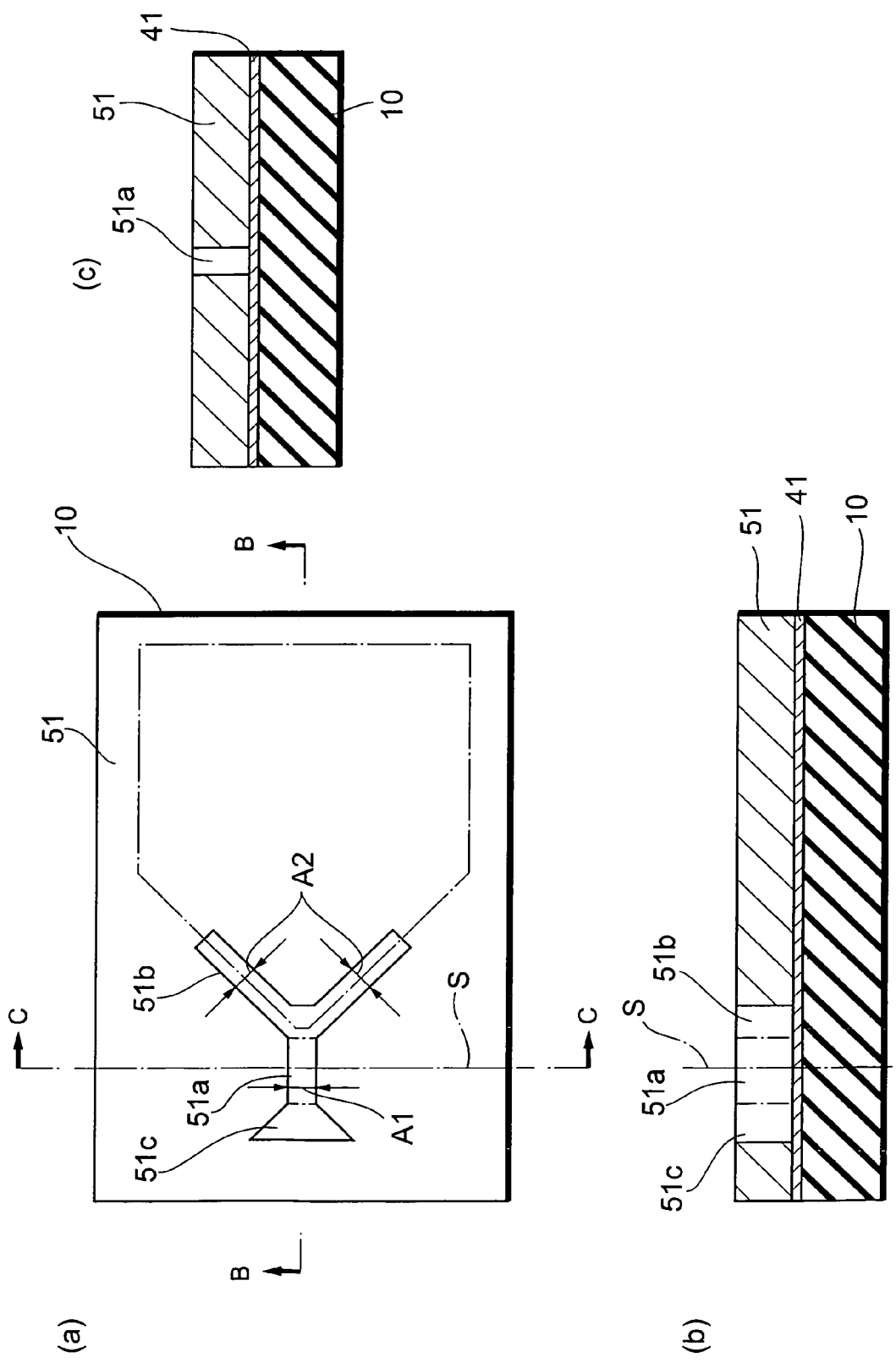
FIG. 7 is a view showing the step subsequent to FIG. 5, in which (a) is a top plan view, (b) is a sectional view taken along the line B-B of (a), and (c) is a sectional view taken along the line C-C of (a) (sectional view taken at the air bearing surface)
Figure 8:
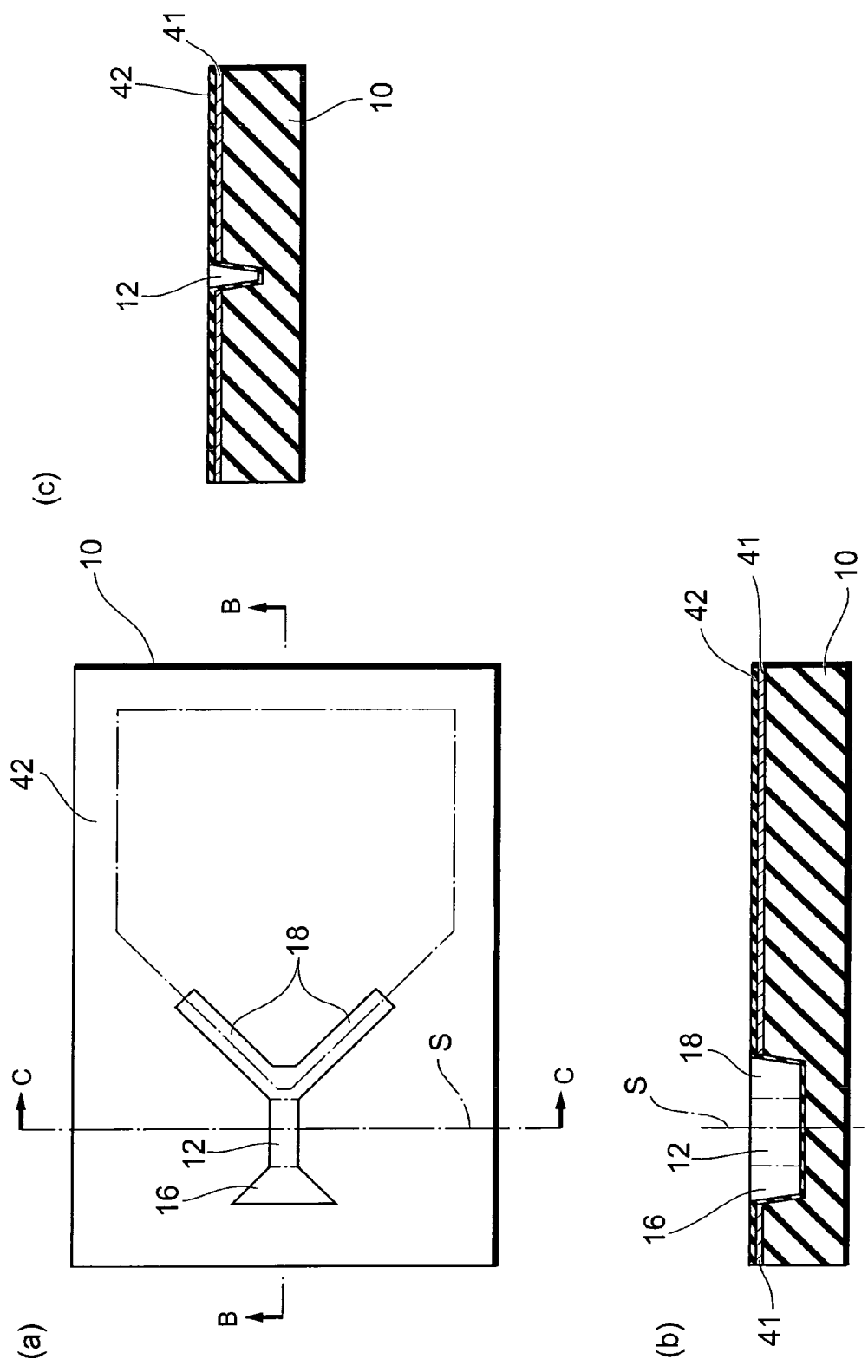
FIG. 8 is a view showing a step subsequent to FIGS. 6 and 7, in which (a) is a top plan view, (b) is a sectional view taken along the line B-B of (a), and (c) is a sectional view taken along the line C-C of (a) (sectional view taken at the air bearing surface)
Figure 9:
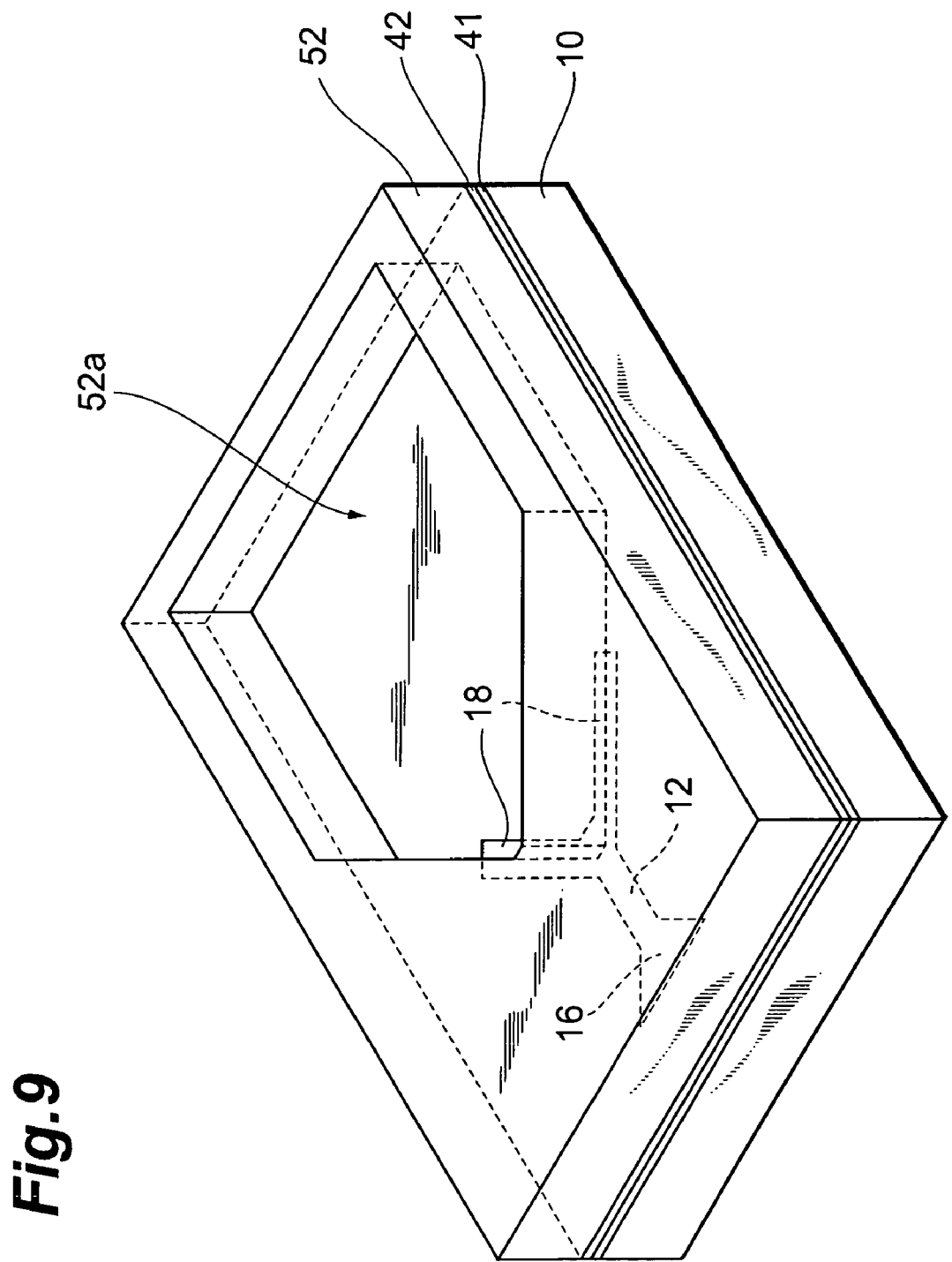
FIG. 9 is a perspective view showing a step subsequent to FIG. 8.
Figure 10:
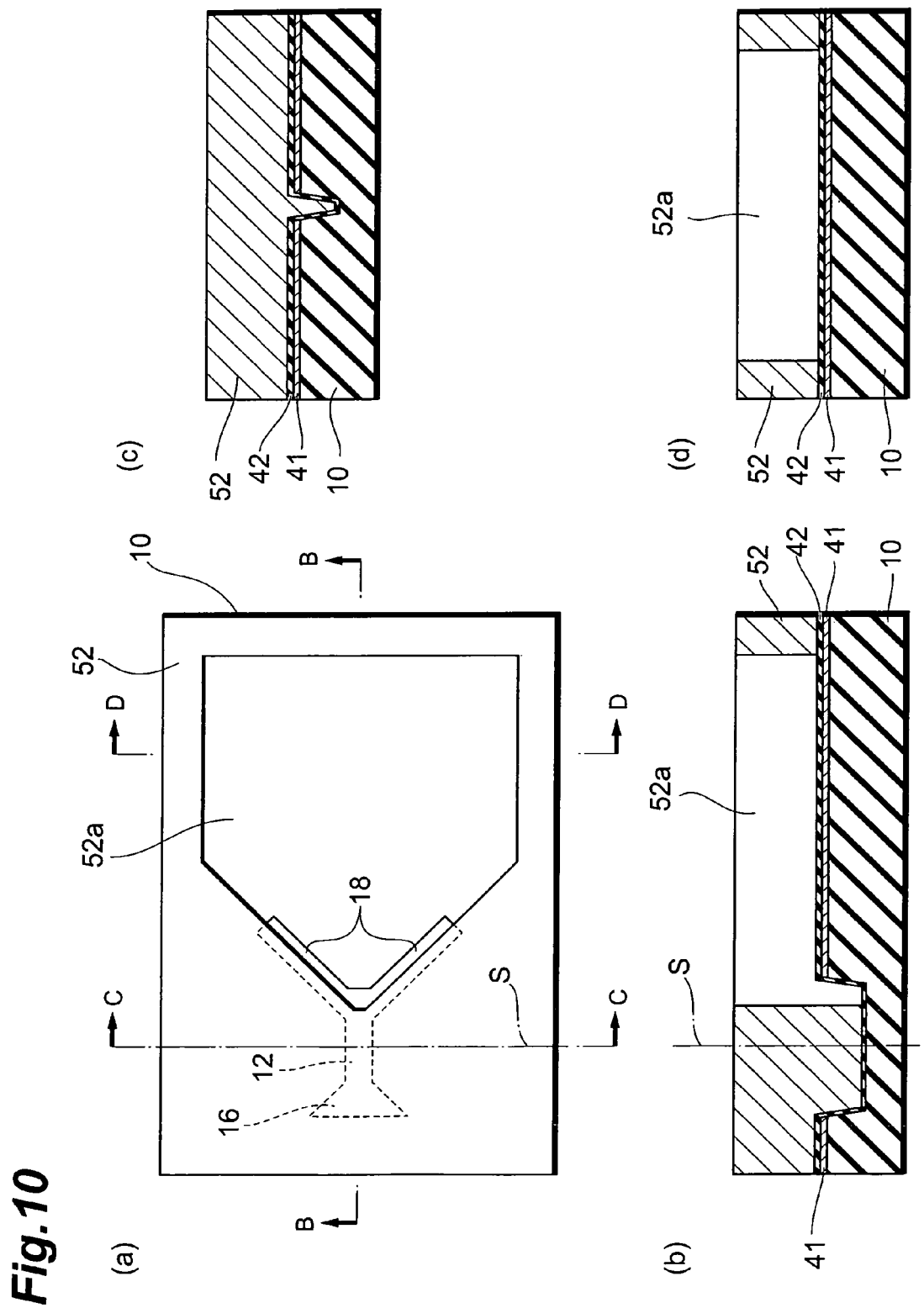
FIG. 10 is a view showing the step subsequent to FIG. 8, in which (a) is a top plan view, (b) is a sectional view taken along the line B-B of (a), (c) is a sectional view taken along the line C-C of (a) (sectional view taken at the air bearing surface), and (d) is a sectional view taken along the line D-D of (a)
Figure 11:
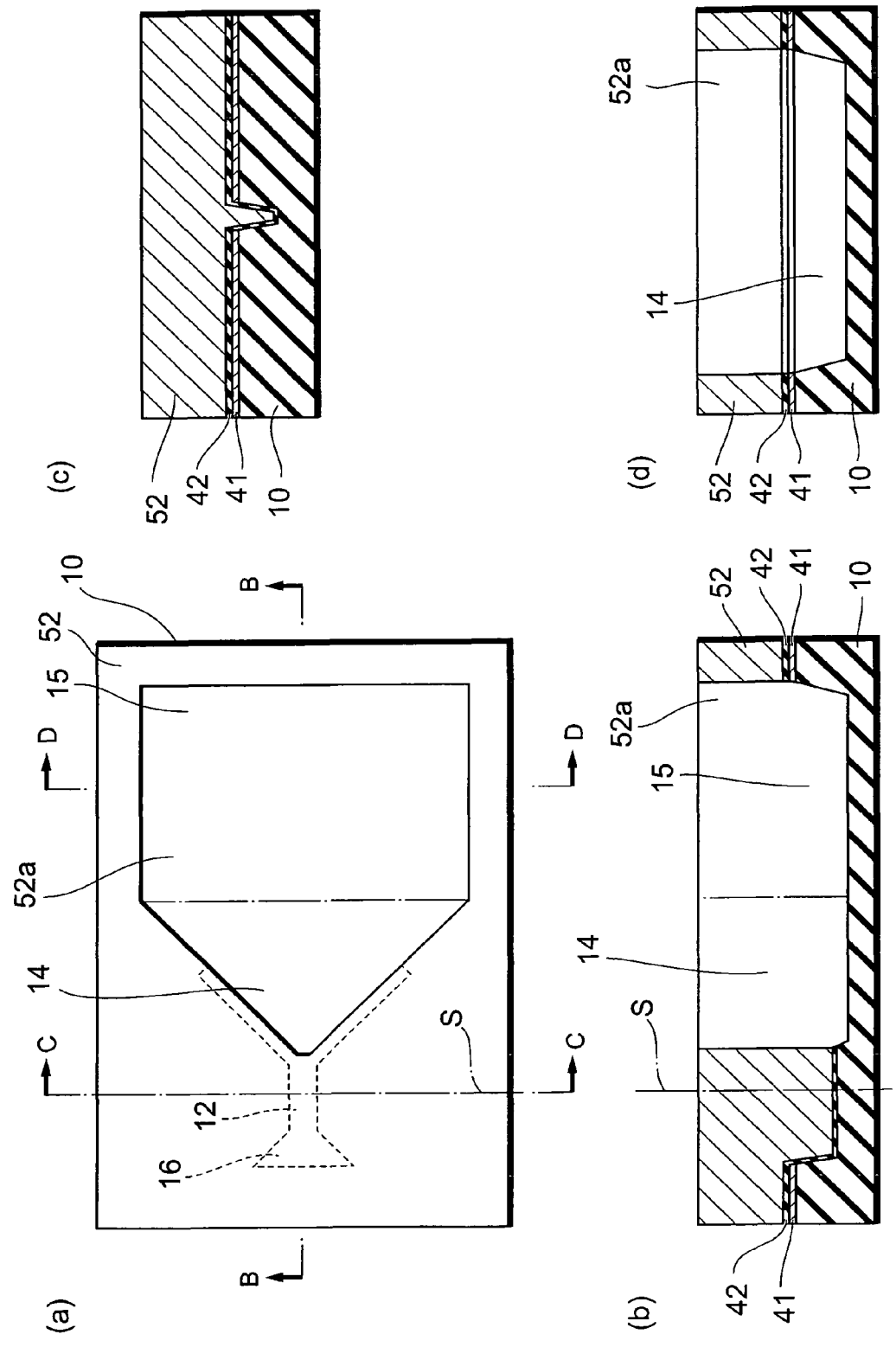
FIG. 11 is a view showing the step subsequent to FIGS. 9 and 10, in which (a) is a top plan view, (b) is a sectional view taken along the line B-B of (a), (c) is a sectional view taken along the line C-C of (a) (sectional view taken at the air bearing surface), and (d) is a sectional view taken along the line D-D of (a)
Figure 12:
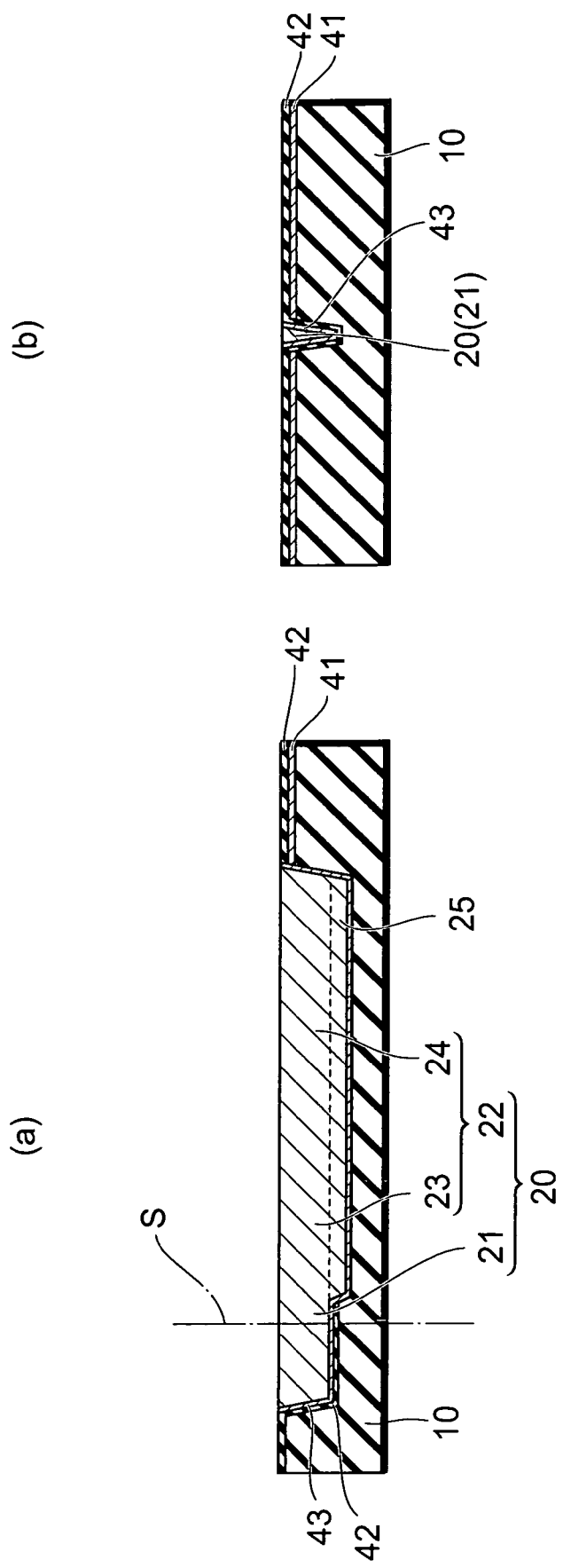
FIG. 12 is a view showing a step subsequent to FIG. 11, in which (a) is a sectional view taken at a plane, perpendicular to the air bearing surface, intersecting the thin-film coil, whereas (b) is a sectional view taken at the air bearing surface.

A method of manufacturing the thin-film magnetic head structure 1 having the above-mentioned configuration will now be explained, with FIGS. 1 and 5 to 15. FIGS. 5, 7 and 8 are views showing respective steps of the method of manufacturing the thin-film magnetic head structure, in which (a) is a top plan view, (b) is a sectional view taken along the line B-B of (a), and (c) is a sectional view taken along the line C-C of (a) (a sectional view taken at the air bearing surface). FIGS. 6 and 9 are perspective views showing respective processes of the thin-film magnetic head structure. FIGS. 10 and 11 are views showing respective steps of the method of manufacturing the thin-film magnetic head structure, in which (a) is a top plan view, (b) is a sectional view taken along the line B-B of (a), (c) is a sectional view taken along the line C-C of (a) (a sectional view taken at the air bearing surface), and (d) is a sectional view taken along the line D-D of (a). FIGS. 12 to 15 are perspective views showing respective steps of the method of manufacturing the thin-film magnetic head structure, in which (a) is a sectional view taken at a plane, perpendicular to the air bearing surface, intersecting the thin-film coil; whereas (b) is a sectional view taken at the air bearing surface.

First, when manufacturing the thin-film magnetic head structure 1, a reproducing head structure comprising an MR device and the like is laminated on an undepicted substrate made of aluminum oxide titanium carbide ($Al_2O_3 \cdot TiC$), for example. Subsequently, an insulating layer 10 made of alumina ($Al_2O_3$) and a nonmagnetic film 41 made of Ta or the like are formed on the upper side of the reproducing head structure (see FIG. 5). The nonmagnetic layer 41 may be omitted.

Next, a photoresist is applied to the nonmagnetic film 41, and is patterned with a predetermined photomask, so as to form a first resist layer 51 which is opened at areas corresponding to the above-mentioned very narrow groove part 12 and protruded depression 16, and a temporary groove part 18 which will be explained later (see FIGS. 6 and 7). Specifically, the first resist layer 51 includes a first slit pattern 51*a* corresponding to the very narrow groove part 12, a second slit pattern 51*b* corresponding to the temporary groove part 18 extending along both outer edges of the first variable width depression 14*a*, and an opening pattern 51*c* corresponding to the protruded depression 16. The second slit pattern 51*b* integrally extends from the first slit pattern 51*a* while bifurcating along both outer edges of the first variable width depression 14*a*. Namely, the first slit pattern 51*a* and the second slit pattern 51*b* form a Y-shaped slit pattern. Therefore, branched slits of the second slit pattern 51*b* extend so as to gradually increase the gap therebetween as distanced farther from the first slit pattern 51*a*. Each of the slit width A1 of the first slit pattern 51*a* and the slit width A2 of the second slit pattern 51*b* can be about 0.15 to 0.25 μm (see part (a) of FIG. 7).

Subsequently, RIE is performed while using the first resist layer 51 as a mask, so as to eliminate the insulating layer 10 and nonmagnetic layer 41 from the portion not covered with the first resist layer 51. This forms the very narrow groove part 12, protruded depression 16, and temporary groove part 18. The temporary groove part 18 has a form corresponding to the second slit pattern 51*b*, and extends in a bifurcating fashion from the very narrow groove part 12 while gradually increasing the gap between the bifurcated branches of the temporary groove part 18 as distanced farther from the very narrow groove part 12. Namely, the very narrow groove part 12 and the temporary groove part 18 form a Y-shaped groove. Here, the temporary groove part 18 defines the outer edges of the first variable width depression 14*a*, so that the angle of inclination at each side face of the temporary groove part 18 becomes the angle of inclination $\theta_2$ at each side face of the first variable width depression. After removing the first resist layer 51, an insulating film 42 made of alumina is formed on the whole surface of the insulating layer 10 by ALCVD (see FIG. 8). Since the thickness of the insulating film 42 can be controlled at a high precision, dimensions (width and depth) of the very narrow groove part 12 largely depending on the thickness of the insulating film 42 can also be controlled at a high precision.

Next, a photoresist is applied to the whole surface of the insulating layer 10 formed with the insulating film 42, and is patterned with a predetermined photomask, so as to form a second resist layer 52 provided with an opening pattern 52*a* corresponding to the above-mentioned main depression 13 (see FIGS. 9 and 10). More specifically, the opening pattern 52*a* has outer edges which are positioned on the inside of the temporary groove part 18 and coincide with the outer edges of the second variable width depression 14*b* and fixed width depression 15.

Subsequently, RIE is performed while using the second resist layer 52 as a mask, so as to eliminate the insulating layer 10, nonmagnetic film 41, and insulating film 42 from the portion not covered with the second resist layer 52 (see FIG. 11). This forms the main depression 13. Here, the etching depth by RIE using the second resist layer 52 as a mask (depth $d_2$ of the main depression 13) is made greater than the etching depth by RIE using the first resist layer 51 as a mask (depth $d_1$ of the very narrow groove part 12) (see FIG. 3). As a result, the stepped part 17 extending along both outer edges of the first variable width depression 14*a* is formed, and a recess corresponding to the opening pattern 52*a* of the second resist layer 52 is formed. Consequently, the height of the first variable width depression 14*a* changes at the stepped part 17. Filling the recess corresponding to the opening pattern 52*a* of the second resist layer 52 with a magnetic material forms the lower yoke layer 25.

The foregoing steps form the cavity 11. After removing the second resist layer 52, a nonmagnetic film 43 made of Ta or Ru is formed on the whole surface of the insulating layer 10.

When the whole surface of the substrate is covered with the insulating film 42, undepicted electrodes and the like formed on the outside of the cavity 11 are also covered with the insulating film 42. Therefore, a step of exposing the electrodes and the like is also performed by RIE using the second resist layer 52, which makes it unnecessary to carry out a step of boring the insulating film 42 separately. As a result, the number of photoresists is not made greater than the conventional one, whereby the increase in cost is suppressed.

Subsequently, the cavity 11 is filled with a magnetic material (e.g., CoNiFe) having a high saturated magnetic flux density (on the order of 2.3 to 2.4 T) by plating. This forms the main magnetic pole layer 20 and lower yoke layer 25 within the cavity 11 (see FIG. 12). The surface of the main magnetic pole layer 20 is subjected to mechanical chemical polishing (which will hereinafter be referred to as CMP) as a flattening process for the whole surface. Here, the nonmagnetic film 43 acts as a stopper member for the CMP, so that the flattening is carried out until it reaches the nonmagnetic film 43. Thus, the nonmagnetic film 43 formed near the very narrow groove part 12 is used for detecting the endpoint of CMP, whereby the amount of polishing in the vicinity of the very narrow groove part 12 is regulated at a high precision.

Figure 13:
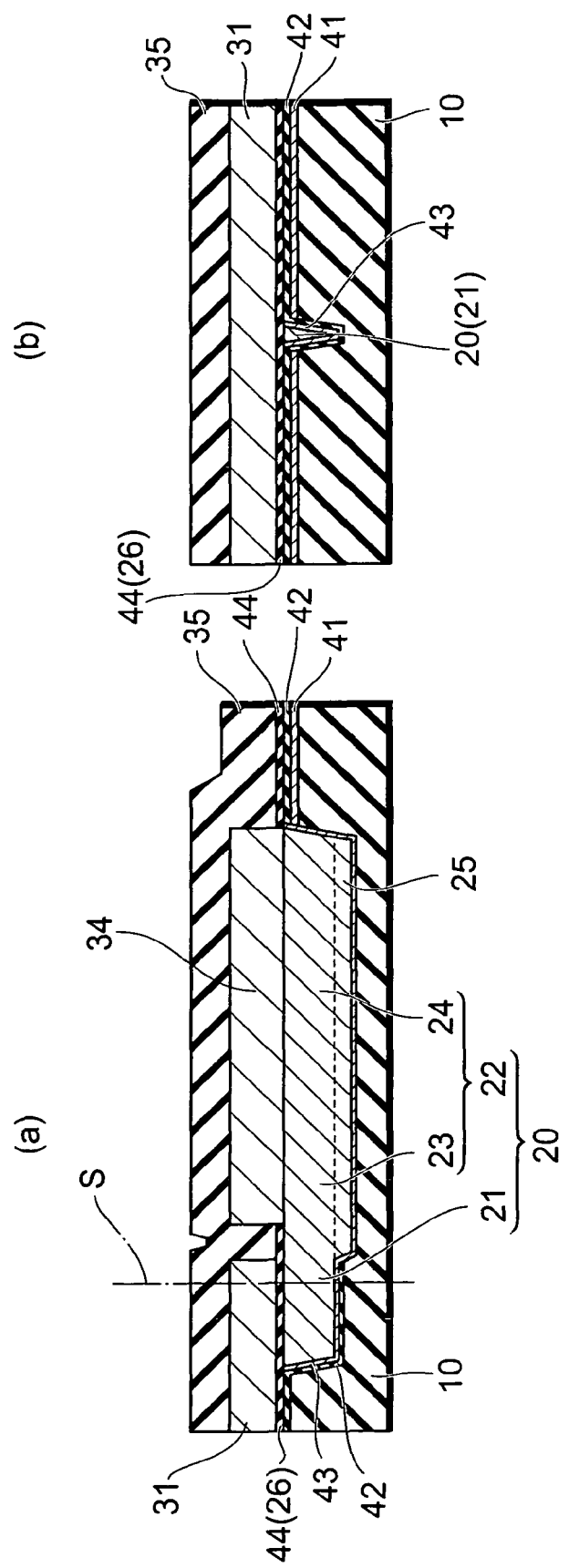
FIG. 13 is a view showing a step subsequent to FIG. 12, in which (a) is a sectional view taken at a plane, perpendicular to the air bearing surface, intersecting the thin-film coil, whereas (b) is a sectional view taken at the air bearing surface.
Figure 14:
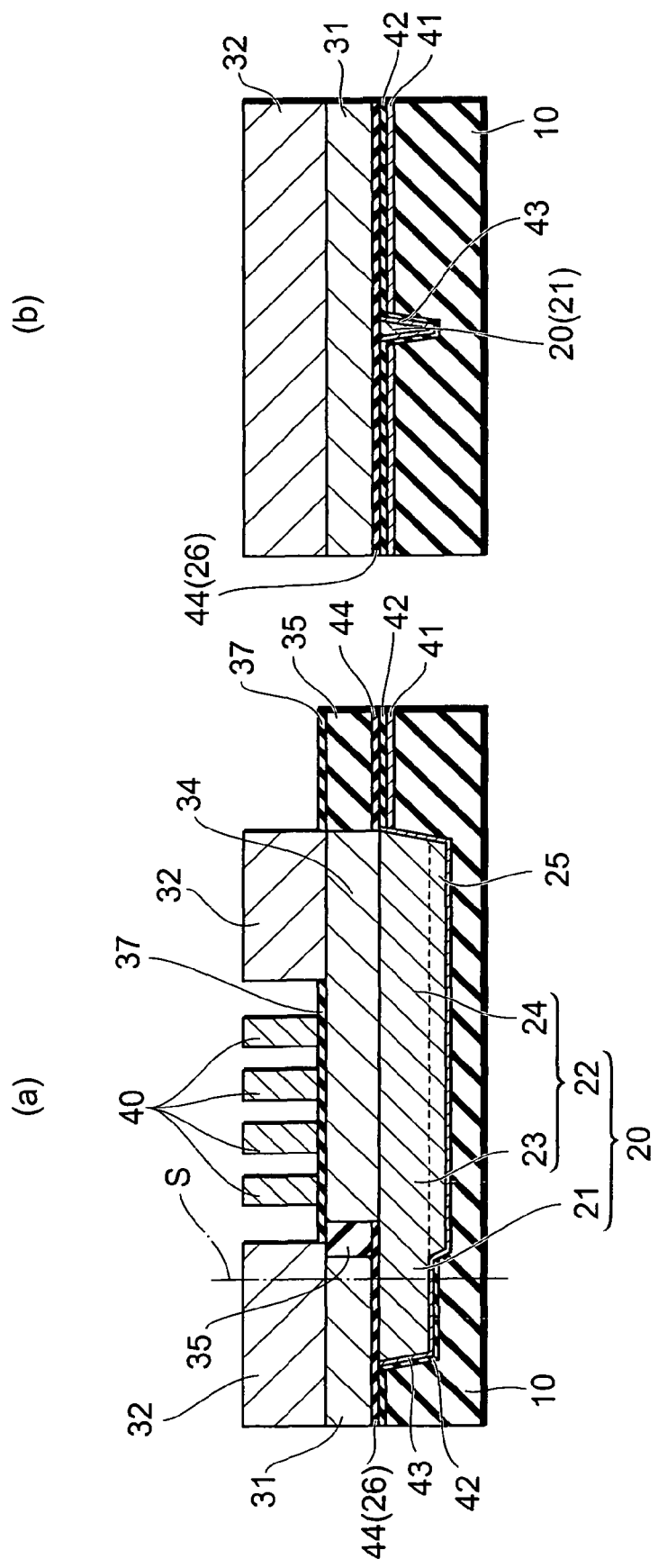
FIG. 14 is a view showing a step subsequent to FIG. 13, in which (a) is a sectional view taken at a plane, perpendicular to the air bearing surface, intersecting the thin-film coil, whereas (b) is a sectional view taken at the air bearing surface.

Next, the nonmagnetic film 43 exposed to the surface is eliminated by ion beam etching (IBE), and then the recording gap layer 26, first shield part 31, back magnetic pole layer 34, and insulating layer 35 are formed as shown in FIG. 13. Specifically, a coating 44 for forming the recording gap layer 24 is formed by a thickness of 400 to 500 Å so as to cover the whole surface of the substrate. For example, an insulating material such as alumina or a nonmagnetic metal material such as Ru, Ni, Cu, Ta, W, Cr, $Al_2O_3$, $Si_2O_3$, or NiPd can be used as the coating 44. Subsequently, in the coating 44, the portion to be formed with the back magnetic pole layer 34 is opened, and the first shield part 31 and back magnetic pole layer 34 are formed at predetermined positions. Here, the first shield part 31 is formed so as to oppose the magnetic pole end part 21 by way of the recording gap layer 26 in order to define the neck height NH. The back magnetic pole layer 34 is formed so as to join with the yoke magnetic pole part 22 (see FIG. 4) exposed to the surface. The first shield part 31 and back magnetic pole layer 34 can be formed by plating with the same magnetic material (e.g., CoNiFe or NiFe) as that of the yoke magnetic pole part 22. Then, the insulating layer 35 made of alumina is formed by a thickness of 1.0 to 1.5 μm, for example, so as to cover the whole surface of the insulating layer 10 and the like.

Next, the whole surface is flattened by CMP such that each of the first shield part 31 and yoke magnetic pole layer 34 attains a thickness on the order of 0.5 to 1.0 μm. Then, an insulating film 37 made of alumina is formed by a thickness of 0.2 to 0.3 μm so as to cover the whole surface of the insulating layer 10 and the like. Subsequently, in the insulating film 37, the portion to be formed with the second shield part 32 is opened. On the upper side of the insulating film 37, an electrode film (not depicted) made of a conductive material and a frame due to photolithography are formed, and electroplating using the electrode film is performed, so as to form a plating layer made of Cu. As a consequence, the plating layer and the electrode film thereunder yield a thin-film coil 40, which is formed on the upper side of the yoke magnetic pole part 20 by way of the insulating film 37. Further, a frame is formed by photolithography not depicted, and the second shield part 32 is formed by frame plating (see FIG. 14). The same magnetic material as that of the first shield part 31 can be used as the second shield part 32. The second shield part 32 may be formed prior to the thin-film coil 40 as well.

Figure 15:
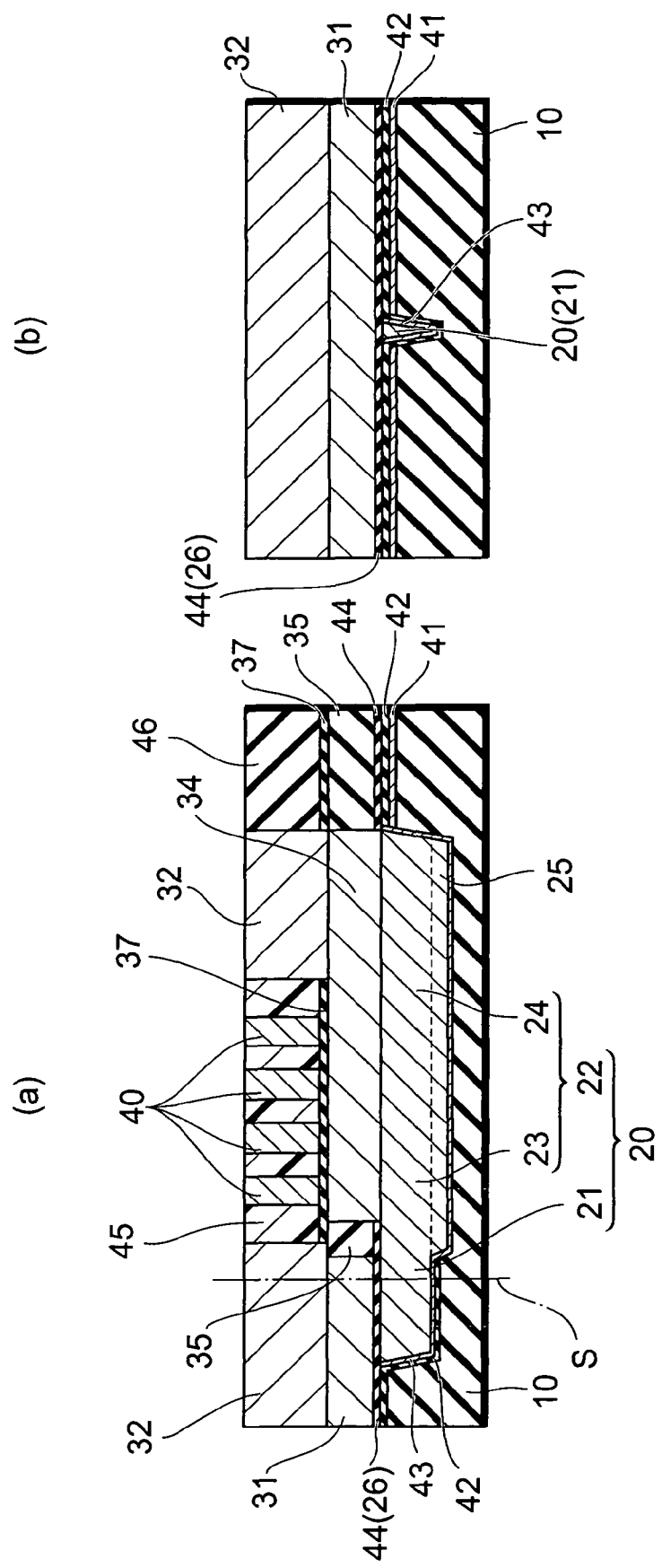
FIG. 15 is a view showing a step subsequent to FIG. 14, in which (a) is a sectional view taken at a plane, perpendicular to the air bearing surface, intersecting the thin-film coil, whereas (b) is a sectional view taken at the air bearing surface.

Next, a photoresist 45 is applied so as to cover the whole surface of the insulating layer 10 and the like, an insulating layer 46 made of alumina is formed thereon by a thickness on the order of 3.0 to 4.0 μm, and then the whole surface is flattened by CMP (see FIG. 15). Subsequently, an insulating film made of alumina is formed by a thickness of about 0.2 μm so as to cover the whole surface of the insulating layer 10 and the like, and then the insulating film is bored so as to expose the second shield part 32. This can yield an insulating film 38 for insulating the thin-film coil 40 and preventing the latter from short-circuiting with the third shield part 33. Finally, the third shield part 33 is formed by a thickness on the order of 2 to 3 μm, so that a write shield layer 30 is produced, whereby the thin-film magnetic head structure 1 shown in FIG. 1 can be obtained (see FIG. 1). When cut at the middle part of the very narrow groove part 12 so as to form the air bearing surface S, the thin-film magnetic head structure 1 formed by way of the foregoing steps yields the thin-film magnetic head 2 in the present invention.

Conventional Method of Manufacturing Thin-Film Magnetic Head

Figure 16:
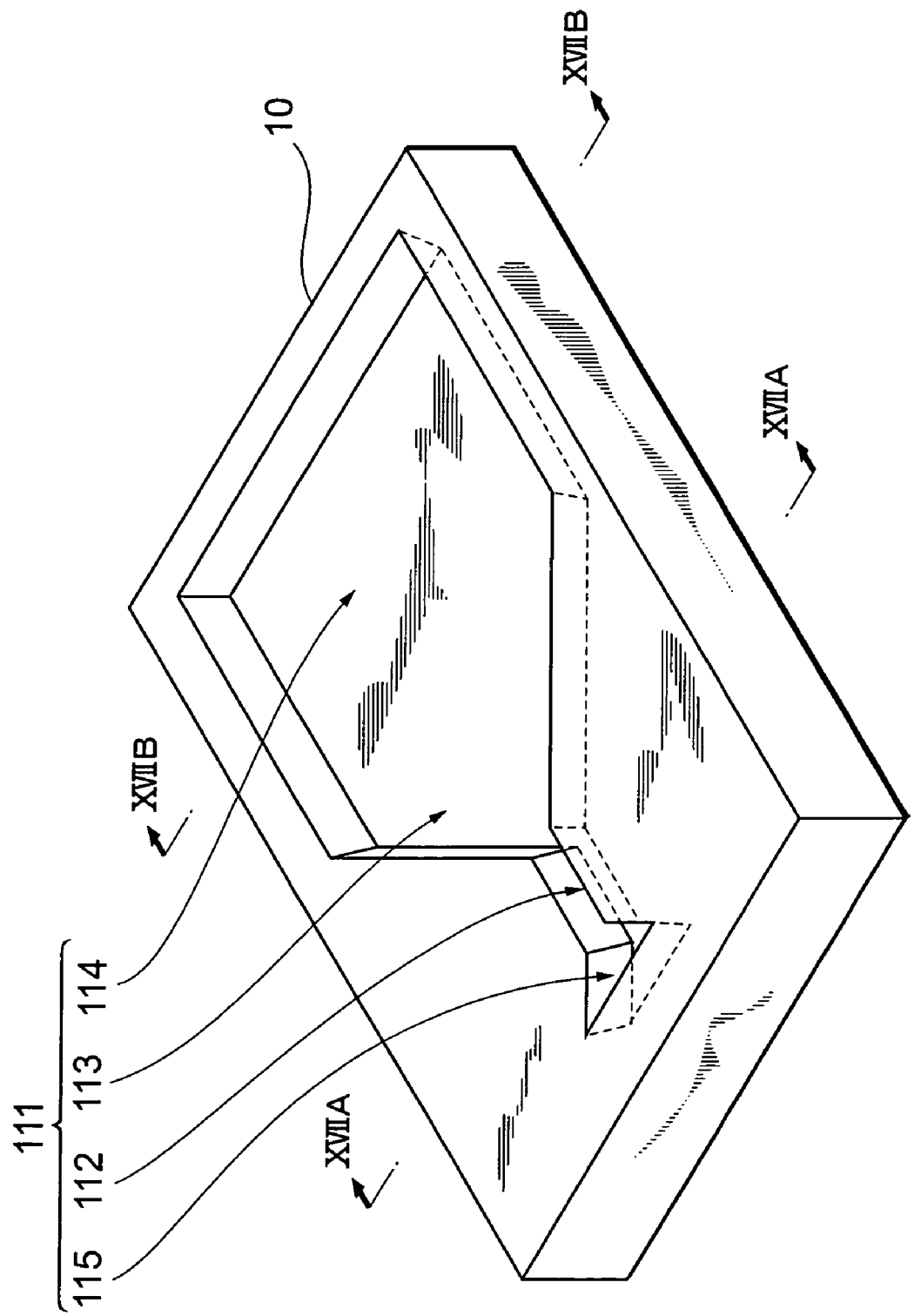
FIG. 16 is a perspective view showing an insulating layer formed with a conventional cavity.

With reference to FIGS. 16 and 17, a conventional method of manufacturing a thin-film magnetic head structure will now be explained. FIG. 16 is a perspective view showing a conventional insulating layer formed with a cavity. It is a sectional view showing a major part of FIG. 16, in which (a) is a sectional view taken along the line XVIIA-XVIIA, whereas (b) is a sectional view taken along the line XVIIB-XVIIB.

When manufacturing a thin-film magnetic head structure, one resist layer has conventionally been used for forming a cavity 111 including a very narrow groove part 112, a variable width depression 113, a fixed width depression 114, and a protruded depression 115. As the resist layer, a resist layer 151 provided with an opening pattern coinciding with the area formed with the cavity 111 has been employed (see FIG. 17). For yielding a uniform magnetic pole width, it has been necessary for the resist layer 151 to be designed such that the width A3 of the portion corresponding to the very narrow groove part 112 is much smaller than the width of the portions corresponding to the variable width depression 113 and the width A4 of the portions corresponding to the fixed width depression 114.

When RIE is performed while using the resist layer 151, the parts of the resist layer 151 positioned on both side portions of the very narrow groove part 112 are close to each other in the portion of the resist layer 151 corresponding to the very narrow groove part 112 as shown in part (a) of FIG. 17. Therefore, radical ions somewhat tilted relative to the vertical direction are blocked by the resist layer 151, so that radical ions enter the insulating layer 10 substantially vertically. In the portions of the resist layer 151 corresponding to the variable width depression 113 and fixed width depression 114, on the other hand, the portions of the resist layer 151 positioned on both sides of the variable depression 113 and fixed width depression 114 are greatly separated from each other (i.e., width A4>width A3) as shown in part (b) of FIG. 17. Therefore, radical ions arriving at the insulating layer 10 while being somewhat tilted relative to the vertical direction cannot be blocked, whereby radical ions enter the insulating layer 10 from directions other than the substantially vertical direction as well.

Hence, in the conventional cavity 111, the angle of inclination $\theta_5$ at each side face of the variable width depression 113 (where the angle is formed by the side face of the variable width depression 113 and a plane perpendicular to the surface of the insulating layer 10) and at each side face of the variable width depression 114 (where the angle is formed by the side face of the fixed width depression 114 and a plane perpendicular to the surface of the insulating layer 10) has been greater than the angle of inclination $\theta_4$ at each side face of the very narrow groove part 112 (angle formed by the side face of the very narrow groove part 112 and a plane perpendicular to the surface of the insulating layer 10). As a consequence, the decrease in bottom area relative to the opening area other than the very narrow groove part 112 has been remarkable as compared with the decrease in bottom area relative to the opening area of the very narrow groove part 112, thus reducing the volume of the cavity 111. This has resulted in a problem that, when a main magnetic pole layer is formed by filling the cavity 111 with a magnetic material, the magnetic volume decreases in the yoke magnetic pole part, which is a part corresponding to the variable width depression 113 and fixed width depression 114 of the main magnetic pole layer, thereby making it hard to further improve the overwrite characteristic.

Further, the following problem has conventionally existed, since the angle of inclination $\theta_5$ is greater than the angle of inclination $\theta_4$. Namely, when a main magnetic pole layer 120 is formed by filling the cavity 111 with a magnetic material, the distance L2a from the air bearing surface S to the start point of a yoke magnetic pole part 122 on the upper face side of the main magnetic pole layer 120 and the distance L2b from the air bearing surface S to the start point of the yoke magnetic pole part 122 on the lower face side of the main magnetic pole layer 120 greatly differ from each other (see part (b) of FIG. 18). This causes a problem in that the magnetic pole end part 121 is longer on the bottom face side of the main magnetic pole layer 120, whereby pole erasure is likely to occur.

By contrast, the method of manufacturing a thin-film magnetic head structure in accordance with this embodiment uses two resist layers constituted by the first resist layer 51 and second resist layer 52 in order to form the cavity 11. Namely, the first resist layer including the first slit pattern 51a and second slit pattern 51b is initially formed on the insulating layer 10, and then RIE is performed while using the first resist layer as a mask, so as to form the very narrow groove part 12 and temporary groove part 18. Subsequently, the first resist layer 51 is removed, and RIE is performed while using the second resist layer 52 as a mask, so as to form the main depression 13.

When performing RIE while using the first resist layer 51 as a mask, the first slit pattern 51a and second slit pattern 51b in the insulating layer 10 expose only the portion corresponding to the very narrow groove part 12 and temporary groove part 18, so that radical ions enter the insulating layer 10 substantially vertically in thus exposed portion. Consequently, not only the angle of inclination $\theta_1$ of the very narrow groove part 12 but also the angle of inclination $\theta_2$ of the side faces in the first variable width depression 14a becomes very acute. As a result, the bottom area of the cavity 11 becomes greater than that conventionally attained, thereby increasing the volume of the very narrow groove part 12. Therefore, when the main magnetic pole layer 20 is formed by using the cavity 11, the magnetic volume of the main magnetic pole layer 20 can further be enhanced, whereby the overwrite characteristic can further be improved.

Figure 18:
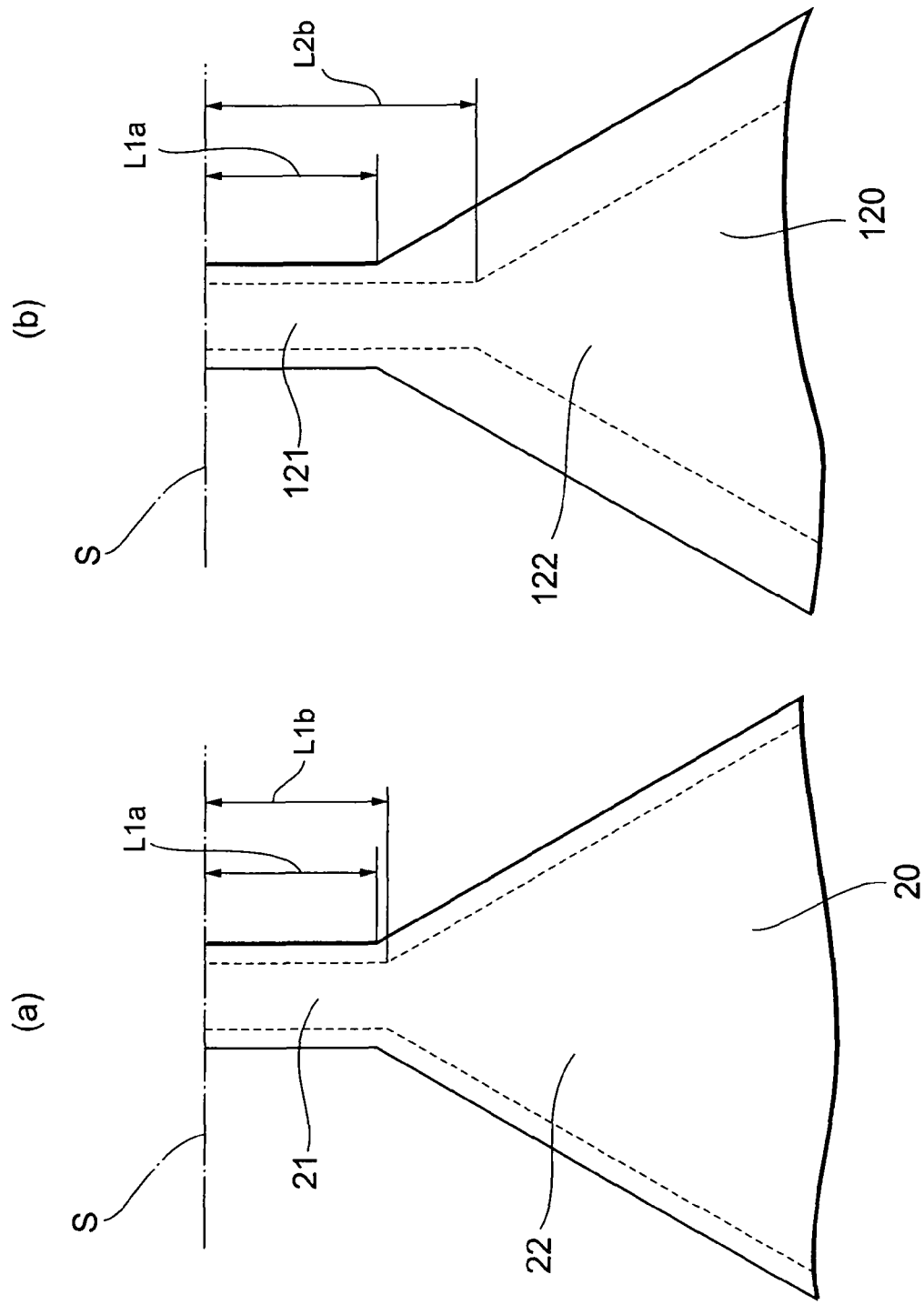
FIG. 18 is a top plan view showing a part of main magnetic pole layers, in which (a) shows the main magnetic pole layer in the embodiment, whereas (b) shows a conventional main magnetic pole layer.

In addition, the angle of inclination $\theta_2$ of the side faces in the first variable width depression 14a becomes very acute, so that, when the main magnetic pole layer 20 is formed by filling the cavity 11 with a magnetic material as shown in part (a) of FIG. 18, the difference between the distance L1a from the air bearing surface S to the start point of the yoke magnetic pole part 22 on the upper face side of the main magnetic pole layer 20 and the distance L1b from the air bearing surface S to the start point of the yoke magnetic pole part 22 on the lower face side of the main magnetic pole layer 20 is much smaller than that attained conventionally. As a result, the magnetic pole end part 21 becomes very short on the bottom face of the main magnetic pole layer 20, thereby making it possible to suppress the occurrence of pole erasure.

The etching depth $d_2$ of the insulating layer 10 when using the second resist layer 52 as a mask is greater than the etching depth $d_1$ of the insulating layer 10 when using the first resist layer 51 as a mask in the method of manufacturing the thin-film magnetic head structure 1 in accordance with this embodiment, so that the stepped part 17 is formed at the boundary between the bottom face of the main depression 13 and bottom face of the very narrow groove part 12 in the cavity 11. Consequently, embedding a magnetic material into the cavity 11 forms the lower yoke layer 25 in addition to the main magnetic pole layer 20. Therefore, the magnetic volume can further be increased.

Since the lower yoke layer 225 has conventionally been formed by plating, the angle γ formed by the end face of the lower yoke layer 225 on the air bearing surface S side and the lower face of the main magnetic pole layer 120 (see the broken line in part (b) of FIG. 19) has been 90°. Therefore, when the end face of the lower yoke layer 225 on the air bearing surface S side is positioned closer to the air bearing surface S, magnetic fluxes leak from the lower yoke layer 225 to the recording medium, thereby generating the pole erasure. Hence, it has been necessary for the lower yoke layer 225 to be formed with a distance of about 1 μm from the air bearing surface S in order to prevent the pole erasure from occurring.

In this embodiment, however, the stepped part 17 is formed within the cavity 11 and has an angle of inclination α as shown in part (b) of FIG. 3. The cavity 11 is filled with a magnetic material, whereby the lower yoke layer 25 is formed such that the angle β formed by the end face of the lower yoke layer 25 on the air bearing surface S side and the lower face of the main magnetic pole layer 20 (see part (a) of FIG. 19) is the same as the angle of inclination α of the stepped part 17. Consequently, the angle δ formed by the lower face of the lower yoke layer 25 and the end face 25a of the yoke layer 25 on the air bearing surface S becomes an obtuse angle greater than 90°, thereby suppressing the leakage of magnetic fluxes from the part with the angle δ. As a result, the occurrence of pole erasure can be suppressed while placing the lower yoke layer 25 closer to the air bearing surface S than in conventional cases, whereas the magnetic volume increases as the lower yoke layer 25 approaches the air bearing surface S, so that the overwrite characteristic can further be improved.

Though a preferred embodiment of the present invention is explained in detail in the foregoing, the present invention can be modified in various manners without being restricted to the above-mentioned embodiment. When employing a cavity 11 in which a fixed width depression 15 continuously extends from the end part of the first variable width depression 14a remote from the air bearing surface S, for example, a second resist layer 53 provided with an opening pattern 53a corresponding to the first variable width depression 14a and fixed width depression 15 and including shoulders 53b may be used as shown in FIG. 20 after using the above-mentioned first resist layer 51 as a mask. In this case, the angle of inclination $\theta_1$ of side faces in the very narrow groove part 12 and the angle of inclination $\theta_2$ of the side faces in the first variable width depression 14a are formed very acute by the first resist layer 51, so that the magnetic volume of the yoke magnetic pole part 22 can be increased. Also, the second resist layer 53 includes the shoulders 53b, by which the magnetic volume of the yoke magnetic pole part 22 can be made greater than that in the above-mentioned embodiment.

Though this embodiment shows a mode in which the second slit pattern 51b corresponds to both outer edges of the first variable width depression 14a, the second slit pattern 51b may correspond to the whole outer periphery of the variable width depression 14 or main depression 13.

What is claimed is:

1. A method of manufacturing a thin-film magnetic head structure adapted to manufacture a thin-film magnetic head comprising a main magnetic pole layer having a magnetic pole end part on a side of a medium-opposing surface opposing a recording medium; a write shield layer opposing the magnetic pole end part so as to form a recording gap layer on the medium-opposing surface side; a thin-film coil wound about the write shield layer or main magnetic pole layer; and a base insulating layer formed with a magnetic pole forming depression, filled with the main magnetic pole layer, including a very narrow groove part defining a form of the magnetic pole end part and a main depression integrally extending from an end part of the very narrow groove part remote from the medium-opposing surface;

the method comprising, when forming the base insulating layer with the magnetic pole forming depression, the steps of:

forming a first resist layer on the base insulating layer, the first resist layer having a first slit pattern corresponding to the very narrow groove part in the magnetic pole forming depression and a second slit pattern integrally extending from the first slit pattern and corresponding to a temporary groove part integrally extending from the very narrow groove part along an outer edge of the main depression;

etching the base insulating layer while using the first resist layer as a mask;

forming a second resist layer having an opening pattern corresponding to the main depression on the base insulating layer after removing the first resist layer; and etching the base insulating layer while using the second resist layer as a mask.

2. A method of manufacturing a thin-film magnetic head structure according to claim 1, wherein the etching of the base insulating layer is deeper when using the second resist layer as the mask than when using the first resist layer as the mask.

3. A method of manufacturing a thin-film magnetic head structure according to claim 2, wherein at least a part of the main depression is constituted by a variable width depression integrally extending from the end part of the very narrow groove part remote from the medium-opposing surface and gradually increasing the width as distanced farther from the very narrow groove part; and wherein the second slit pattern extends along the outer edge of the variable width depression.

4. A method of manufacturing a thin-film magnetic head structure according to claim 1, wherein at least a part of the main depression is constituted by a variable width depression integrally extending from the end part of the very narrow groove part remote from the medium-opposing surface and gradually increasing the width as distanced farther from the very narrow groove part; and wherein the second slit pattern extends along the outer edge of the variable width depression.

5. A method of manufacturing a thin-film magnetic head structure according to claim 1, wherein the second slit pattern extends in a bifurcating fashion from the first slit pattern along both outer edges of the main depression.

* * * * *